United States Patent
Alaküla et al.

(10) Patent No.: US 12,054,061 B2
(45) Date of Patent: Aug. 6, 2024

(54) ELECTRIC PROPULSION SYSTEM FOR A VEHICLE

(71) Applicants: VOLVO TECHNOLOGY CORPORATION, Gothenburg (SE); SIBBHULTSVERKEN AB, Sibbhult (SE)

(72) Inventors: Mats Alaküla, Lund (SE); Anders Göransson, Tormestorp (SE)

(73) Assignees: VOLVO TECHNOLOGY CORPORATION, Gothenburg (SE); SIBBHULTSVERKEN AB, Sibbhult (SE)

( * ) Notice: Subject to any disclaimer, the term of this patent is extended or adjusted under 35 U.S.C. 154(b) by 840 days.

(21) Appl. No.: 17/254,702

(22) PCT Filed: Jun. 29, 2018

(86) PCT No.: PCT/EP2018/067545
§ 371 (c)(1),
(2) Date: Dec. 21, 2020

(87) PCT Pub. No.: WO2020/001779
PCT Pub. Date: Jan. 2, 2020

(65) Prior Publication Data
US 2021/0114473 A1   Apr. 22, 2021

(51) Int. Cl.
*B60L 53/24* (2019.01)
*B60K 1/02* (2006.01)

(52) U.S. Cl.
CPC ............. *B60L 53/24* (2019.02); *B60K 1/02* (2013.01); *B60L 2210/40* (2013.01); *B60L 2220/42* (2013.01); *B60L 2220/54* (2013.01)

(58) Field of Classification Search
CPC .......... B60L 50/51; B60L 50/52; B60L 50/53; B60L 53/24; B60L 2210/40;
(Continued)

(56) References Cited

U.S. PATENT DOCUMENTS

| 5,710,699 A | * | 1/1998 | King | B60L 50/40 |
| | | | | 318/139 |
| 6,919,711 B2 | * | 7/2005 | Haydock | B60L 50/51 |
| | | | | 322/29 |

(Continued)

FOREIGN PATENT DOCUMENTS

| DE | 102010002154 A1 | 8/2011 |
| DE | 102010031691 A1 | 1/2012 |

(Continued)

OTHER PUBLICATIONS

European Office Action dated Jan. 14, 2022 in corresponding European Patent Application No. 18738240.3, 6 pages.

(Continued)

*Primary Examiner* — Jeffrey J Restifo
(74) *Attorney, Agent, or Firm* — Venable LLP; Jeffri A. Kaminski

(57) ABSTRACT

The invention relates to an electric propulsion system (100) for a vehicle (1), said system comprising a first electrical machine (12) and a second electrical machine (14) for providing propulsion to said vehicle, characterized in that said system further comprises an electrically isolated coupling assembly (20) configured to provide electrical isolation between said first and said second electrical machines; a first bidirectional DC/AC converter (68) disposed in a first electrical connection (82) extending from the first electrical machine; a second bidirectional DC/AC converter (69) disposed in a second electrical connection (84) extending from the second electrical machine; a switch assembly (30) connected via at least one of the bidirectional DC/AC converters to at least one of the first and second electrical machines and further connected to an onboard energy storage system (40); and wherein said switch assembly is configured to connect at least one of the first electrical machine and the second electrical machine to either the (Continued)

onboard energy storage system (40) or to an externally supplied power source (50, 90), thereby said switch assembly being configured to set the electric propulsion system in a number of operational modes.

17 Claims, 9 Drawing Sheets

(58) Field of Classification Search
CPC ............ B60L 2210/42; B60L 2210/44; B60L 2210/46; B60K 1/02; B60K 2007/0038; B60K 2007/0061
See application file for complete search history.

(56) References Cited

U.S. PATENT DOCUMENTS

| | | | |
|---|---|---|---|
| 7,854,203 B2 | 12/2010 | Kumar | |
| 8,054,031 B2* | 11/2011 | Uechi | B60W 30/192 318/376 |
| 9,350,179 B2 | 5/2016 | Ando et al. | |
| 9,580,065 B2* | 2/2017 | Bangura | B60K 1/02 |
| 9,610,845 B2* | 4/2017 | Namuduri | F02N 11/006 |
| 9,969,253 B2* | 5/2018 | West | B60L 50/30 |
| 10,044,352 B2* | 8/2018 | Hirose | B60L 3/003 |
| 10,106,053 B2* | 10/2018 | Fukuchi | B60L 58/40 |
| 10,293,702 B2* | 5/2019 | Tu | B60L 50/20 |
| 10,919,407 B2* | 2/2021 | Lu | B60L 58/10 |
| 11,888,389 B1* | 1/2024 | Meyer-Teruel | H02M 1/4225 |
| 2014/0239869 A1* | 8/2014 | Gorka | B60L 53/24 318/496 |
| 2021/0114473 A1* | 4/2021 | Alaküla | B60K 1/02 |
| 2022/0063423 A1* | 3/2022 | Rodionov | H02J 7/02 |
| 2023/0166724 A1* | 6/2023 | Wang | B60L 53/22 701/22 |
| 2023/0309442 A1* | 10/2023 | Ogura | B60L 50/66 56/10.2 R |
| 2023/0365013 A1* | 11/2023 | Hatano | B60L 53/24 |

FOREIGN PATENT DOCUMENTS

| | | | | |
|---|---|---|---|---|
| EP | | 2855192 A1 | 4/2015 | |
| EP | | 3006254 A1 | 4/2016 | |
| EP | | 3180208 A1 | 6/2017 | |
| WO | | 2013182211 A1 | 12/2013 | |
| WO | WO-2015020579 A1 * | | 2/2015 | .............. B60K 6/20 |

OTHER PUBLICATIONS

European Office Action dated Jun. 15, 2023 in corresponding European Patent Application No. 18738240.3, 5 pages.
International Search Report and Written Opinion dated Mar. 14, 2019 in corresponding International PCT Application No. PCT/EP2018/067545, 12 pages.
International Preliminary Report on Patentability dated Sep. 17, 2020 in corresponding International PCT Application No. PCT/EP2018/067545, 17 pages.

* cited by examiner

ELECTRIC PROPULSION SYSTEM FOR A VEHICLE

CROSS-REFERENCE TO RELATED APPLICATIONS

This application is a U.S. National Stage application of PCT/EP2018/067545, filed Jun. 29, 2018, and published on Jan. 2, 2020, as WO 2020/001779 A1, all of which is hereby incorporated by reference in its entirety.

TECHNICAL FIELD

The invention relates to an electric propulsion system for a vehicle. The invention also relates to a vehicle comprising such an electric propulsion system. The invention further relates to a method for controlling such an electric propulsion system by a control unit.

The invention can be applied in any type of hybrid vehicles or electrical vehicles, such as partly or fully electrical vehicles. Although the invention mainly is described with respect to an electrical bus, the invention is not restricted to this particular vehicle, but may also be used in other hybrid or electrical vehicles such as electrical trucks, electrical construction equipment, and electrical cars. The invention may also be applied in any other type of electrical vehicle such as trucks, cars, electrical powered construction equipment, electrical working machines e.g. wheel loaders, articulated haulers, dump trucks, excavators and backhoe loaders etc.

BACKGROUND

In the field of electric propulsion systems for vehicles, such as electrical vehicles, there are several different onboard configurations for storing of electrical energy and for providing propulsion to the vehicle by converting the electrical energy to electric power. Typically, the on-board energy storage system has a battery pack assembly connected to an electrical machine for providing or absorbing electrical power as required by the system. The onboard energy storage system should be arranged at a suitable location in the vehicle so as to ensure that the battery pack assembly can be discharged and charged in an appropriate manner in terms of efficiency and safety. By way of example, such battery pack assemblies are often rechargeable batteries and typically include a number of battery cells that may be connected in series and/or in parallel forming a complete battery pack assembly for the vehicle.

In these types of systems, charging of batteries are frequently performed by connecting the vehicle to an external electrical network when the vehicle is at stand still, e.g. an external line voltage static supply, such as a three-phase 400 volts static AC grid supply by means of an on board or off board battery charger. In this manner, current is transferred from the external electric network to the batteries on board the vehicle. In connection with charging of the batteries, it is desirable to ensure galvanic isolation between the external electrical supply network and the batteries on board the vehicle. Galvanic isolation is in the described context mainly used for safety reasons, i.e. preventing the external electric supply grid to supply currents into the vehicle chassis that thereby can be dangerous to touch or can cause a disconnection of an ongoing charging session. Galvanic isolation between the electrical network and the batteries can be provided in several different ways in electric propulsion systems.

WO 2013/182211 A1 discloses one example of an electrical vehicle comprising an electrical drive system and an electrical machine. In this type of system, galvanic isolated charging of the battery is obtained by using two separate multi-phase bridge inverters connected to two separate stator windings in the electrical machine. In particular, the electrical machine comprises a rotor, a first set of multi-phase stator windings and a second set of multi-phase stator windings electrically separated from the first set of multi-phase stator windings. In addition, the electrical apparatus comprises a switch for connecting a first multi-phase bridge inverter to a second multi-phase bridge inverter such that the high potential side of the first multi-phase bridge inverter DC link is connected to the high potential side of the second multi-phase bridge inverter DC link and a low potential side of the first multiphase bridge inverter DC link is connected to a low potential side of the second multi-phase bridge inverter DC link.

Despite the activity in the field, there remains a need for further improving charging of an electric propulsion system for a vehicle, such as a partly or fully electrical vehicle, while maintaining a balance between the costs and components for providing a desired level of galvanic isolation of the system.

SUMMARY

An object of the invention is to provide an improved electric propulsion system for a vehicle, in which various functions such as charging, discharging and providing desired propulsion can be provided in a versatile manner without compromising on efficiency and security during use thereof. The object is at least partly achieved by an electric propulsion system according to claim 1.

According to a first aspect of the invention, there is provided an electric propulsion system for a vehicle. The electric propulsion system comprises a first electrical machine and a second electrical machine for providing propulsion to the vehicle. The system further comprises an electrically isolated coupling assembly configured to provide electrical isolation between the first and the second electrical machines; a first bidirectional DC/AC converter disposed in a first electrical connection extending from the first electrical machine; a second bidirectional DC/AC converter disposed in a second electrical connection extending from the second electrical machine; a switch assembly connected via at least one of the bidirectional DC/AC converters to at least one of the first and second electrical machines and further connected to an onboard energy storage system. Moreover, the switch assembly is configured to connect at least one of the first electrical machine and the second electrical machine to either the onboard energy storage system or to an externally supplied power source. Thereby, the switch assembly is configured to set the electric propulsion system in a number of operational modes.

In other words, the switch assembly is configured to control electrical power flow between at least one of the first and second electrical machines, the onboard energy storage system and at least one externally supplied power source. In particular, when the electric propulsion system is in a traction operational mode, the switch assembly is configured to direct electrical power from the onboard energy storage system to at least one of the first and second electrical machines. In addition, when the electric propulsion system is in the traction operational mode and simultaneously connected to an externally supplied power source, e.g. in the form of a conductive electric road system, the switch assembly can be configured to direct electrical power from the externally supplied power source to at least one of the first and second electrical machines.

Moreover, when the electric propulsion system is set in a charging operational mode, the onboard energy storage system can be supplied by power for charging from at least one externally supplied power source. It is also conceivable that the onboard energy storage system can be charged by one of the electric machines working as an electric generator. Thus, when the electric propulsion system is set in the charging operational mode, at least one of the electrical machines can be set to function as an electric generator to convert mechanical power to electricity by generating electrical power. Accordingly, when the electric propulsion system is in the charging operational mode, the switch assembly is configured to direct supplied electrical power from at least one externally supplied power source via the first and second electrical machines to the onboard energy storage system. In particular, when the electric propulsion system is connected to the externally supplied power source, power is transferred from the externally supplied power source to one of the electrical machines via the switch assembly, and then from the electrical machine to the other electrical machine via the coupling assembly, and then from the other electrical machine to the onboard energy storage system via the switch assembly. The electrical propulsion system is typically connected to the externally supplied power source by an interface, such as a charging interface.

In addition, or alternatively, when the electric propulsion system is in the charging operational mode, the switch assembly can also be configured to direct generated electrical power from at least one of the first and second electrical machines to the onboard energy storage system.

The example embodiments of the electric propulsion system are particularly useful for vehicles such as electrical vehicles, including partly and fully electrical vehicles, hybrid electrical vehicles, plug-in hybrid electrical vehicles or any other type of electrical vehicle. Electrical vehicles are provided with electrical machine(s) and generally an onboard energy storage system such as a battery pack assembly. The onboard energy storage system is configured to provide power to the electrical machines, thereby providing propulsion for the vehicle and also to power any other types of electrical loads in various types of construction equipment and other equipment.

In this type of vehicles, it has also been observed that the there is need for providing a safe and efficient galvanic isolation between an external power supply and the components making up the electric propulsion system, including the onboard energy storage system. For instance, when the vehicle is connected to an external electrical power supply source such as a conductive electric road system, no protective earth is generally available. Thus, in order to safely keep the electrical potential of vehicle's body floating with respect to the electric road system voltage, the components of the electric propulsion system connected to the electric road system need to be galvanically isolated from the electric road system voltage. However, one problem when providing galvanic isolation between the electric propulsion system and the external electric power supply system is that the external electric power supply system should still provide high electrical power levels to the propulsion system, including the onboard energy storage system for charging. In addition, there is an increasing demand for keeping a balance between the costs, weight and dimensions of such system so as to provide a system that can be installed in various types of electrical vehicles.

The electrically isolated coupling assembly according to the example embodiments described herein is configured to facilitate galvanic isolation of the vehicle electrical propulsion when transferring high electric powers from an external electric power source to the vehicle. The example embodiments are particularly useful for charging from a conductive electric road system continuous supply source, in which the vehicle is not connected to protective earth. Thus, by the example embodiments of the system, it becomes possible to provide an electric propulsion system comprising dual electric machines and having an integrated charging solution for the electrical vehicle allowing for charging from a static external electrical power supply as well as for charging from a conductive electric road system continuous supply source, such as an electric road.

The switch assembly in combination with the electrical machines enable a connection of the individual electrical traction machines to the onboard energy storage system and to one or more external electric power sources. By providing an electric propulsion system having a plurality of electrical machines, it becomes possible to provide the vehicle with multi-axle drive, e.g. 4-wheel drive, and torque-vectoring between left and right driving wheels. The switch assembly of the example embodiments can be applied to any configuration of an electric propulsion system with at least two electrical machines, including electrical machines in the form of separate sets of electric motors and electrical machines separated by that stator winding is separated in at least two galvanically independent parts, as described in e.g. WO 2013/182211.

In particular, the example embodiments of the electric propulsion system can be connected to at least one external electrical power supply source, but often to several different types of external electrical power supply source, including e.g. an electric power static AC grid supply, an external DC source and a conductive electric road system continuous supply of either AC or DC voltage. In the case of an external AC supply, there is typically a need for an on-board rectification to DC before connection to the switch assembly. In this manner, the electric propulsion system can be charged and powered during stand-still and during driving of the vehicle. It is to be noted that the vehicle is typically connected to either an electric power static AC grid supply or an external DC power source when there is a need for charging the onboard energy storage system in a stand-still position of the vehicle, while the vehicle can be powered from a conductive electric road system continuous DC or AC supply during operation and/or driving of the vehicle. That is, the electrical machines can be powered directly by the conductive electric road system continuous DC or AC supply during driving of the vehicle. Also, if desired or required, the onboard energy storage system can be charged by the conductive electric road system continuous DC or AC supply during operation and/or driving of the vehicle. This is a further advantage during operation of a fully or partly electrical vehicle including an electric propulsion system according to the example embodiments described herein.

As mentioned above, the example embodiments of the electric propulsion system comprising the electrical machines can be set in several different modes depending on the situation and needs, whereby the various operational modes are controlled by the switch assembly. For instance, at acceleration of the vehicle, both electrical machines can be used for traction to utilize full power. In particular, each one of the electrical machines can be powered from the conductive electric road system continuous DC or AC supply, or one electrical machine from the onboard energy storage system and the other one from the conductive electric road system continuous DC or AC supply. Further, during driving or cruising, one electrical machine can be utilized to provide both tractive and charging power in a motoring mode and the other one for charging in a generating mode. The power ratio between traction and charging can vary depending on the needs. In addition, each one of the electrical machines can be powered from the onboard energy storage system of the system. Also, at stand-still of the vehicle, the onboard energy storage system can be charged from an external electric power static AC grid or DC source. Moreover, the electric propulsion system can be configured to provide an electric power take off (ePTO). The ePTO can e.g. be provided by the onboard energy storage system via an auxiliary system interface. In addition, or alternatively, the ePTO can e.g. be provided by the onboard energy storage system via the interface to the external power supply source.

Typically, the operational modes include at least the traction mode and the electrical charging mode, or sometimes simply denoted as the charging mode.

In addition, or alternatively, the operational modes may include a combined traction and charging mode where power is transferred from the externally supplied power source to at least one of the electrical machines via the switch assembly and at least a portion of the power is transferred from the at least one of the electrical machines to the onboard energy storage system. Typically, the electric power is fed from the external supplied power source to one of the electrical machines via the switch assembly and at least a portion of the electric power is fed from the other one of the electrical machines to the onboard energy storage system via the switch assembly. It should be readily appreciated that power is transferable from the one of the electrical machines to the other electrical machine. Typically, power is transferable from the one of the electrical machines to the other electrical machine by means of the electrically isolated coupling assembly, as mentioned herein.

In addition, or alternatively, the operational modes may include any one of a conductive electric road DC power supply mode, a conductive electric road AC power supply mode, an electric AC grid static charging mode and an electric AC grid static supplying mode.

In addition, or alternatively, the operational modes include an electric power take off mode. In the electric power take off mode, it becomes possible for the electric propulsion system to supply energy to an auxiliary system of the vehicle or another auxiliary system connected to the vehicle via the charging interface to the external power source.

The electrically isolated coupling assembly provides for transferring power between the first electrical machine and the second electrical machine, while also providing electrical isolation between the first and second electrical machines. Accordingly, it should be readily appreciated that the electrically isolated coupling assembly is configured to transfer power between the first electrical machine and the second electrical machine. That is, the electrically isolated coupling assembly allows for mechanically connecting the first electrical machine with the second electrical machine. This means that power can be transferred from the first electrical machine to the second electrical machine by means of the coupling assembly and that power can be transferred from the second electrical machine to the first electrical machine by means of the coupling assembly.

By the provision of having an electrically isolated coupling assembly configured to provide electrical isolation between the first and the second electrical machines, it is ensured that each one of the electrical machines is electrically isolated relative each other during use thereof. By way of example, the electrically isolated coupling assembly is configured to provide individual electrical isolation of the conductive components making up an electrical machine, e.g. the magnetic cores, the housing and rotors from the structures they are mechanically connected to like a mechanical transmission. It is to be noted that when the onboard energy storage system is charged by a static AC supply source and the electric propulsion system is earthed, it is enough that the electrically isolated coupling assembly is configured to provide electrical isolation between the first and the second electrical machines. However, in situations when the electric propulsion system is not connected to earth, e.g. when the onboard energy storage system is charged by a conductive electric road power supply source, the first and second electrical machines should be electrical isolated relatively each other and relatively the chassis, respectively. Thus, the electrically isolated coupling assembly is typically, although not strictly required, configured to provide individual electrical isolation of at least the first and the second electrical machines relatively each other and relatively the chassis. This may sometimes be denoted as the electrically isolated coupling assembly is configured to provide double electrical isolation.

Therefore, according to one example embodiment, the electrically isolated coupling assembly is configured to provide electrical isolation of at least the first and second electrical machines relatively each other and relatively the chassis.

By way of example, each one of the electrical machine comprises at least a magnetic core, a housing and a rotor. In this type of electrical machine, each one of the core, housing and the rotor is electrical isolated relative each other. According to one example embodiment, the core, the housing and the rotor of the first electrical machine is independently electrical isolated relative the core, the housing and the rotor of the second electrical machine. Hence, the electrically isolated coupling assembly is configured to provide independent electrical isolation of the core, the housing and the rotor of the first electrical machine and independent electrical isolation of the core, the housing and the rotor of the second electrical machine. In this manner, one example of an electrically isolated coupling assembly is provided in which the first electrical machine and the second electrical machine are electrical isolated relatively each other and relatively the chassis.

Generally, the term "electric propulsion system", as used herein, typically refers to vehicle electrical components for providing energy (such as traction energy) and for storing energy (delivering and receiving energy). In other words, an electric propulsion system refers to a system configured to provide propulsion to a vehicle by converting electrical energy to mechanical energy, the electrical energy provided by means of the onboard energy storage system. Besides the electrical components as mentioned above, an electric propulsion system may include additional components such as cable(s), sensor(s), control units, battery management unit(s) etc. The electric propulsion system is in particular configured to deliver and receive energy for providing propulsion to the vehicle, but also for performing various vehicle operations of the vehicle.

Typically, the onboard energy storage system is a part of the electric propulsion system. Thus, in one example embodiment, the electric propulsion system also comprises the energy storage system. The energy storage system is typically a DC electrical power source. The DC electrical power source is typically provided in the form of a battery pack assembly or an onboard fuel cell. It is to be noted that the battery pack assembly can refer to one or several number of battery pack(s). In addition, it is to be noted that the battery pack assembly can include different types of batteries. By way of example, any one of the batteries in the battery pack assembly is any one of a lithium-ion battery or sodium-ion battery. A sodium-ion battery typically includes any type of sodium iron battery or sodium ferrite battery. The battery pack assembly thus typically comprises a set of battery packs. Also, it is to be noted that the battery pack is generally a so called high voltage battery pack. In this context, the term "high voltage" refers to a battery pack of about 400-1000 voltage (V). Further, the term "power", as used herein, typically refers to electrical power. Electrical power is the product of voltage and current.

By way of example, the switch assembly is connected to the onboard energy storage system by another electrical connection. Generally, this type of electrical connection is a common electrical connection comprising a first branch electrical connection and a second branch electrical connection. The common electrical connection is typically connected to a first terminal of the switch assembly and a second terminal of the switch assembly via the first branch electrical connection and the second branch electrical connection, respectively. In this context, the first terminal and the second terminal of the switch assembly provides two separate points of connection to the switch assembly.

An electrical connection is configured for transporting electrical power between two or more components, such as between an electrical machine and a power electronic converter, between an electrical machine and a bidirectional DC/AC converter etc.

The externally supplied power sources can be in the form of an external DC supply or in the form of an external AC supply converted to DC on board by means of a bidirectional DC/AC converter.

It is to be noted that the electric propulsion system also comprises a set of bidirectional converters, as mentioned above. The bidirectional DC/AC converter can be provided in several different configurations. One example of a suitable bidirectional DC/AC converter is a 2-level Voltage Source Converter.

According to one example embodiment, the second bidirectional DC/AC converter is disposed in the second electrical connection and in-between the second electrical machine and the switch assembly.

According to one example embodiment, the switch assembly is connected to each one of the first and second electrical machines via the first and second bidirectional DC/AC converters, respectively.

According to one example embodiment, the first electrical machine is separately connected to the switch assembly by the first electrical connection and the second electrical machine is separately connected to the switch assembly by the second electrical connection. The first bidirectional DC/AC converter is disposed in the first electrical connection, and in-between the first electrical machine and the switch assembly, while the second bidirectional DC/AC converter is disposed in the second electrical connection, and in-between the second electrical machine and the switch assembly.

The switch assembly can be provided in several different manners according to the example embodiments. According to one example embodiment, the switch assembly is configured to individually connect each one of the first electrical machine and the second electrical machine to either the onboard energy storage system or to the externally supplied power source.

Thereby, the electric propulsion system is configured to transfer power between the first electrical machine and the onboard energy storage system via the switch assembly, transfer power between the second electrical machine and the onboard energy storage system via the switch assembly, and, when said electrical propulsion system is connected to the externally supplied power source, to transfer power between the externally supplied power source and any one of the first and second electrical machines via the switch assembly.

In this manner, the switch assembly is configured to set each one of the electrical machines in the number of the operational modes, as described herein. That is, the switch assembly is configured to individually connect the first electrical machine to either the onboard energy storage system or to the externally supplied power source and further configured to individually connect the second electrical machine to either the onboard energy storage system or to the externally supplied power source. Thus, the switch assembly enables one of electrical machines to be individually connected to the onboard energy storage system via the switch assembly and the other one of the electrical machines to be individually connected to the number of externally supplied power source via the switch assembly. It should also be readily appreciated that the switch assembly enables one of electrical machines to be individually connected to the onboard energy storage system via the switch assembly and the other one of the electrical machines to be individually connected to the onboard energy storage system via the switch assembly. It should also be readily appreciated that the switch assembly enables one of electrical machines to be individually connected to one of externally supplied power sources via the switch assembly and the other one of the electrical machines to be individually connected to the externally supplied power source via the switch assembly.

To this end, the switch assembly is configured to control electrical power flow between the first and second electrical machines, the onboard energy storage system and the externally supplied power source. If the switch assembly is configured to connect to several externally supplied power sources, the switch assembly is configured to control electrical power flow between the first and second electrical machines, the onboard energy storage system and the externally supplied power sources.

By way of example, when the switch assembly connects the first electrical machine to the onboard energy storage system and the second electrical machine to the externally supplied power source, the switch assembly is capable of directing power from the externally supplied power source via the switch assembly to the first electrical machine and power from the second electrical machine to the onboard energy storage system via the switch assembly.

According to one example embodiment, the switch assembly is configured to connect with a number of externally supplied power sources. Thus, in one example embodiment, the switch assembly is configured to individually connect each one of the first electrical machine and the second electrical machine to either the onboard energy storage system or to the externally supplied power source.

According to one example embodiment, the switch assembly comprising a number of switch devices including at least a first switch device for the first electrical machine and a second switch device for the second electrical machine, each one of the first and second switch devices having a terminal coupled to a corresponding electrical machine, a terminal coupled to the onboard energy storage system and a terminal coupled to the externally supplied power source.

By way of example, any one of the switch devices of the number of switch devices comprises either one double pole on-off switch or two single pole on-off switches.

The electric propulsion system can be connected to the electric power static AC grid supply in several different manners. According to one example embodiment, the electric propulsion system further comprises a third bidirectional AC/DC converter assembly disposed in an electrical connection extending between the switch assembly and an electric power grid static AC supply interface, thereby enabling the electric propulsion system to connect to an externally supplied AC power source. It is to be noted that the vehicle is typically connected to the electric power static AC grid supply when there is a need for charging the onboard energy storage system in a stand-still position of the vehicle.

Moreover, the electric propulsion system can be configured to connect to the conductive electric road system continuous AC supply in several different manners. According to one example embodiment, the system comprises a fourth AC/DC converter assembly disposed in an electrical connection extending between the switch assembly and a conductive electric-road system continuous AC supply interface, thereby enabling the system to connect to an externally supplied AC power source. In particular, by the configuration of the fourth AC/DC converter, it becomes possible to convert AC supply to DC on board by means of the fourth AC/DC converter. Thereby, the system can be configured to connect to another type of externally supplied AC power source during e.g. driving of the electrical bus. For instance, an electrical bus can be powered from the conductive electric road system continuous AC supply during operation (driving) of the electrical bus. That is, the electrical machines can be powered directly by the conductive electric road system continuous AC supply during driving of the vehicle. Also, if desired or required, the onboard energy storage system can be charged by the conductive electric road system continuous AC supply during operation (driving) of the vehicle.

According to one example embodiment, the system further comprises a switch device disposed in the electrical connection extending between the switch device and the conductive electric road system continuous supply interface. Typically, the switch device is connectable to the conductive electric road system continuous supply via an AC/DC converter if the electric road system is supplying AC power or directly to the electric road system if it is supplying DC power.

The electric propulsion system is typically connected to the externally supplied electrical power source by a connector. The connector is typically a standard connector adapted to the available line voltage. The line voltage may be a single phase low voltage supply having e.g. 240 volts and a 10 A fuse which will give a relatively long charging time. However, the line voltage is more often a three-phase supply, e.g. a three-phase 400 volts supply with a 32 or 63 A or even higher current fuse, which will allow a higher charging capacity and a faster charging. As mentioned herein, the supply may also be a DC supply.

An electrical machine is used as a power source for driving the electrical vehicle when the electric propulsion system is in the traction mode. The electrical machine may however also be used for other purposes, e.g. to power different rotational equipment such as hydraulic pumps on construction equipment vehicles According to one example embodiment, the first electrical machine and the second electrical machine are embedded in a common housing, the first electrical machine corresponds to a first set of multi-phase stator windings and the second electrical machine corresponds to a second set of multi-phase stator windings, the first and second set of multi-phase stator windings being electrically isolated from each other and arranged to rotate a common rotor, and wherein the common housing, the common rotor and a magnetic core are further electrical isolated from a chassis. The number of phases used in the electrical machine can be selected according to the requirements and on the design of the electric propulsion system. A suitable number of phases are e.g. three or five. The common housing thus comprises a first three-phase stator winding and a second three-phase stator winding. The stator windings are separated from each other but are magnetically connected to each other and are positioned on the same stator of the electric machine.

According to one example embodiment, each one of the first and second electrical machines are embedded in separate first and second housings, respectively, and each one of the first and second electrical machines comprises a separate rotor and a separate set of multi-phase stator windings. The number of phases used in the electrical machine can be selected according to the requirements and on the design of the electric propulsion system, as mentioned above.

It is to be noted that the electric propulsion system may comprise more electrical machines than the first and second electrical machines. Thus, the electric propulsion system is not limited to include exactly two electrical machines, but may include a plurality of electrical machines. Each one of the electrical machines can be provided in several different manners. According to one example embodiment, each electrical machine is any one of a permanent magnet synchronous machine, a brushless DC machine, an asynchronous machine, an electrically magnetized synchronous machine, a synchronous reluctance machine or a switched reluctance machine.

Typically, the first and second electrical machines are configured for driving at least a ground engaging member. Typically, the first and second electrical machines are configured for driving a pair of ground engaging members. By way of example, the ground engaging member is a wheel, a track or the like.

While the first and second electrical machines are typically configured for driving a pair of ground engaging members, it is also conceivable that the first and second electrical machines can be configured for driving one single ground engaging member.

The electrical machines can be coupled to the ground engaging members in several different manners. In one example embodiment, each one of the electrical machines is coupled to a pair of ground engaging members by means of a transmission and a clutch. The transmission typically comprises a number of gears including a neutral gear. By way of example, each one of the electrical machines is arranged to be decoupled from the ground engaging members by means of e.g. the clutch or the neutral gear, allowing the electrical machines to rotate, while the vehicle is at stand still.

Typically, the electric propulsion system comprises a control unit for controlling the electric propulsion system. The control unit may include a microprocessor, microcontroller, programmable digital signal processor or another programmable device. Thus, the control unit comprises electronic circuits and connections as well as processing circuitry such that the control unit can communicate with different parts of the electric propulsion system such as the electrical machines, the switch assembly, the electrical energy source (e.g. onboard energy storage system), the bidirectional DC/AC converters and any other parts in need of being operated in order to provide the functions of the example embodiments.

Typically, the control unit may also be configured to communicate with other parts of the vehicle such as the brakes, suspension, the clutch, transmission and further electrical auxiliary devices, e.g. the air conditioning system, in order to at least partly operate the vehicle. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transistory memory for storing computer program code and data upon. Thus, the control unit may be embodied by many different constructions.

In other words, the control functionality of the example embodiments of the electric propulsion system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium.

Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the electric propulsion system described above can include a control unit being an integral part thereof, it is also possible that the control unit may be a separate part of the vehicle, and/or arranged remote from the electric propulsion system and in communication with the electric propulsion system.

According to one example embodiment, the control unit is configured to control the switch assembly to set the electric propulsion system in the number of operational modes, as mentioned above.

According to a second aspect of the present invention, there is provided a vehicle comprising a chassis and comprising an electric propulsion system according to any one of the example embodiments as mentioned in relation to the first aspect. The vehicle may be an electrical, hybrid, or plug-in hybrid vehicle. Thus, the vehicle may be a fully electrical vehicle or a partly (i.e. a hybrid) electrical vehicle. The vehicle comprises at least the first and second electrical machines, wherein the onboard energy storage system provides power to the electrical machines for providing propulsion for the vehicle.

According to a third aspect of the present invention, there is provided a method for controlling an electric propulsion system according any one of the example embodiments as mentioned above in relation to the first aspect. The method generally comprises the step of controlling the switch assembly, by means of a control unit, to set the electric propulsion system in any one of the number of operational modes, as mentioned above.

Thus, the system typically comprises the control unit configured to control the switch assembly between the number of operational modes comprising at least the traction mode and the electrical charging mode. Moreover, there is provided a control unit configured to perform any one of the functions as mentioned above in relation to any one of the example embodiments of the first aspect. Effects and features of the third aspect of the invention are largely analogous to those described above in connection with the first aspect.

According to a fourth aspect of the present invention, there is provided a computer program comprising program code means for performing the steps of any one of the embodiments of the third aspect when the program is run on a computer.

According to a fifth aspect of the present invention, there is provided a computer readable medium carrying a computer program comprising program means for performing the steps of any one of the embodiments of the third aspect when the program is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
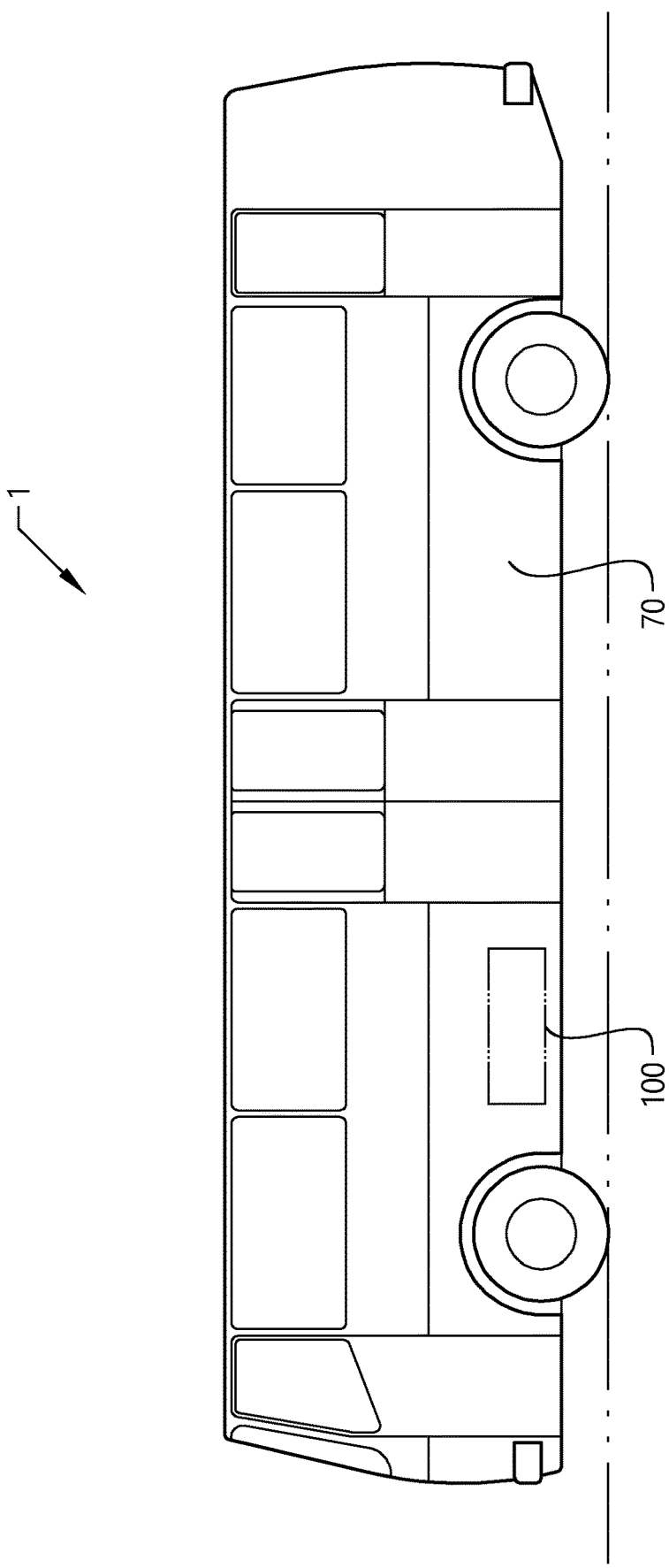
FIG. 1 is a side view of a vehicle in the form an electrical bus according to example embodiments of the invention.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of an electrical vehicle, in particular an electrical bus. The electrical bus 1 comprises an electric propulsion system 100 for providing propulsion to the electrical bus. Besides providing propulsion to the vehicle, the electric propulsion system or parts of system can manage other electronic functions of the vehicle.

Figure 2:
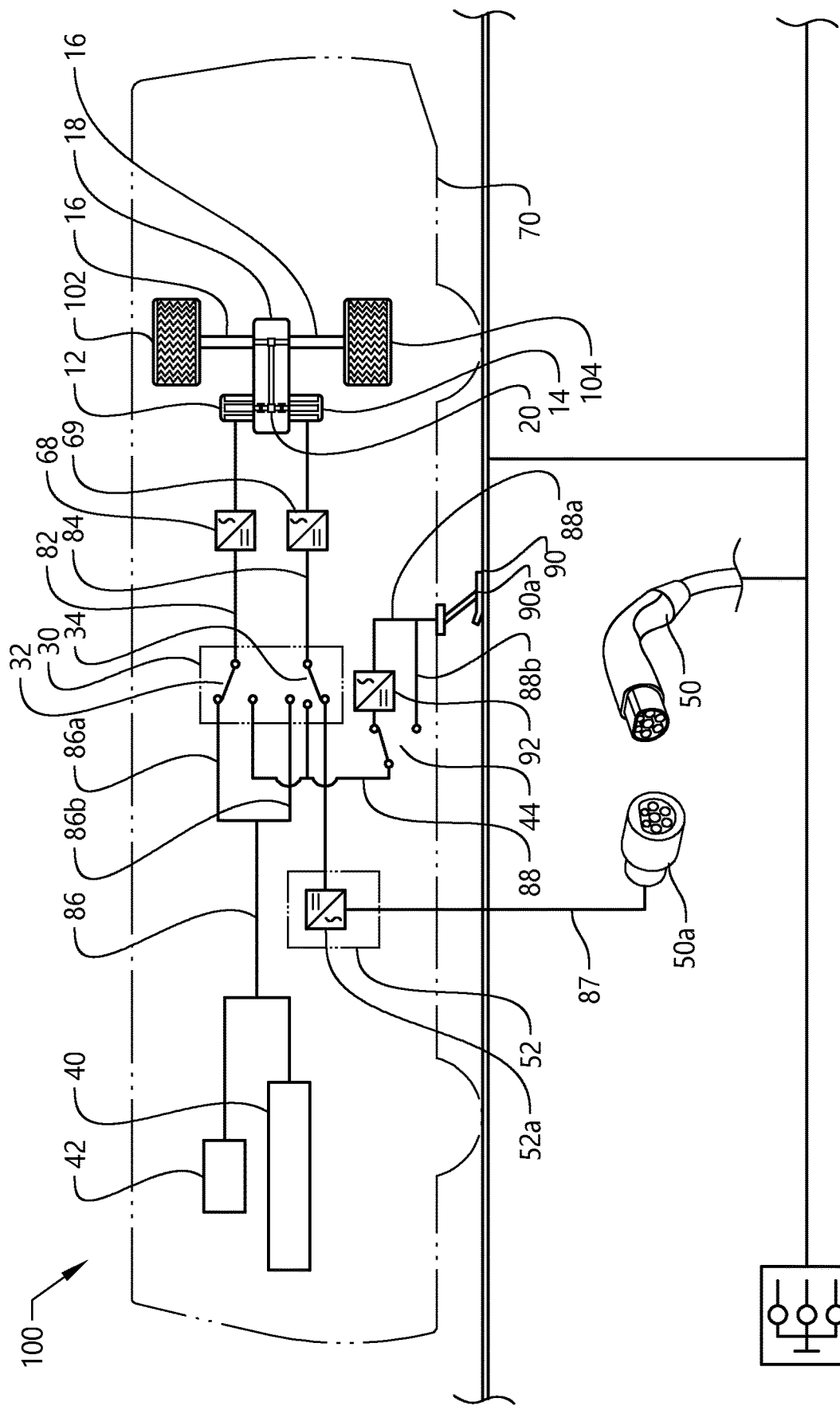
FIG. 2 schematically illustrates parts of an electric propulsion system for a vehicle according to one example embodiment of the invention.

FIG. 2 schematically illustrates parts of an electric propulsion system 100 according to one example embodiment of the invention. The electric propulsion system 100 can be incorporated and installed in a bus as illustrated in FIG. 1, or in any other type of partly or fully electrical vehicle. As illustrated in FIG. 2, the electric propulsion system comprises an onboard energy storage system 40. The onboard energy storage system is a DC onboard energy storage system such as a battery packs assembly comprising a number of battery packs (not shown). By way of example, each one of the battery packs is a lithium-ion battery. Moreover, each one of battery packs comprises a number of battery cells. For instance, the battery pack assembly comprises seven battery packs. The number of battery packs in the battery pack assembly and the number of battery cells varies depending on type of vehicle and type of installation, etc. As mentioned above, the battery pack assembly is arranged to provide power to a plurality of electrical machines 12, 14 arranged for providing propulsion for the electrical bus 1. In addition, the onboard energy storage system 40 (e.g. the battery pack assembly) is configured to power one or more auxiliary components commonly denoted as an auxiliary system 42 of the vehicle. The auxiliary system can include several different components. One example of an auxiliary component is an air conditioning system (although not shown). Another example of an auxiliary system is an external electrical equipment connected to the vehicle. Thus, the onboard energy storage system 40 is connected to one or more auxiliary systems 42 or auxiliary components. The electrical bus 1 may further comprise a battery management unit (not shown) which is configured to control and monitor the battery pack assembly. The battery management unit can further be configured to monitor battery cell characteristics such as state of charge (SOC) and open circuit voltage of the battery cells etc. In this example, the battery management unit is an integral part of the onboard energy storage system 40.

As mentioned above, and which is illustrated in e.g. FIG. 2, the electric propulsion system 100 comprises a set of electrical machines. In particular, the electric propulsion system 100 comprises a first electrical machine 12 and a second electrical machine 14. The first electrical machine 12 is configured for providing propulsion to the vehicle 1. Analogously, the second electrical machine 14 is configured for providing propulsion to the vehicle. Further, the first and second electrical machines are operatively connected to each other to transfer power there between, as described herein. In this example embodiment, each one of the first and second electrical machines 12, 14 are embedded in separate first and second housing, respectively. Moreover, each one of the first and second electrical machines comprises a separate rotor and a separate set of multi-phase stator windings. In this example, each one of the electrical machines 12, 14 is a permanent magnet synchronous machine.

As may be gleaned from FIG. 2, the first and second electrical machines are configured for driving a pair of ground engaging members 102, 104 in the form of wheels. Optional, the electrical propulsions system comprises a transmission 18 for transmitting a rotational movement from the electric machines 12, 14 to a propulsion shaft 16, sometimes denoted as the driven shaft. The propulsion shaft connects the transmission to the pair of wheel 2, 104. Furthermore, although not shown, the electrical machines 12, 14 are typically coupled to the transmission by a clutch. In this manner, the electrical machines 12, 14 are permitted to be decoupled from the wheel. In this manner, the electrical machines 12, 14 are capable of rotating while the vehicle is at stand still. The electrical machines 12, 14 can also be decoupled from the wheels 102, 104 by means of engaging a neutral gear of the transmission.

Turning again to the example embodiments in FIG. 2, the electric propulsion system also comprises an electrically isolated coupling assembly 20 configured to provide electrical isolation of at least the first and the second electrical machines 12, 14 relatively each other and the chassis 70. It is to be noted that the electrically isolated coupling assembly should at least be configured to provide electrical isolation between the first and the second electrical machines. In this manner, it is ensured that each one of the electrical machines is electrically isolated relative each other. The electrically isolated coupling assembly 20 is only schematically illustrated in FIG. 2, however, further details of some conceivable examples of an electrically isolated coupling assembly are described in relation to FIGS. 5a-5d. FIG. 5a schematically illustrates parts of one example embodiment of an electrically isolated coupling assembly for the electric propulsion system 100, e.g. the system 100 as described in relation to FIG. 2. In this example, the electrically isolated coupling assembly 20a, 20b, 20c and 20d, 20e, 20f is configured to provide independent electrical isolation of the conductive components making up the first and second electrical machines 12, 14, respectively. Typically, each one of a core, a housing and a rotor of each electric machine is electrically isolated relative each other so as to ensure galvanic isolation when the vehicle is in charging mode. In the example embodiment described in relation to FIG. 5a, each one of the electric machines 12, 14 comprises a set of multi-phase windings, which are denoted by reference numerals 12b and 14b, respectively. Accordingly, each one of the first and second electric machines 12, 14 comprises a set of multi-phase windings 12b, 14b and e.g. magnetic cores (not shown), a housing 12a, 14a and rotors (not shown). Referring again to FIG. 5a and the first electric machine 12, the multi-phase winding 12b is electrically isolated from the housing 12a by the electrically isolated coupling 20a. The electrically isolated coupling 20a is e.g.

an enameled conductor in a slot with a slot liner and some form of winding impregnation material. Moreover, an outgoing shaft 15 of the first electric machine 12 is electrically isolated from the propulsion shaft 16 by the electrically isolated coupling 20b.

The electrically isolated coupling 20b is e.g. a shaft coupling partly made of a non electrically conducting material configured for transferring a rotational motion between the outgoing shaft 15 and the propulsion shaft 16. The first electrical machine 12 is electrically isolated from the chassis 70 by an electrically isolated coupling 20c. In particular, the first electrical machine 12 is electrically isolated from the chassis 70 by an electrically isolated coupling 20c in the form of a non-electrically conducting distance between the housing and the conducting part of the vehicle that the electrical machine is assembled to, e.g. a mechanical transmission (not shown).

Regarding the second electrical machine 14, the multi-phase winding 14b is electrically isolated from the housing 14a by the electrically isolated coupling 20d. The electrically isolated coupling 20d is e.g. an enameled conductor in a slot with a slot liner and some form of winding impregnation material. Moreover, an outgoing shaft 17 of the second electric machine 14 is electrically isolated from the propulsion shaft 16 by the electrically isolated coupling 20e. The electrically isolated coupling 20e is e.g. a shaft coupling partly made of a non-electrically conducting material configured for transferring a rotational motion between the outgoing shaft 17 and the propulsion shaft 16. Typically, although strictly not required, the second electrical machine 14 is electrically isolated from the chassis 70 by the electrically isolated coupling 20f.

In other words, the core, the housing and the rotor of the first electrical machine 12 is independently electrical isolated relative the core, the housing and the rotor of the second electrical machine 14.

Hence, the electrically isolated coupling assembly 20 is configured to provide independent electrical isolation of the core, the housing and the rotor of the first electrical machine and independent electrical isolation of the core, the housing and the rotor of the second electrical machine. In this manner, the first electrical machine and the second electrical machine are thus electrically isolated relatively each other.

It is to be noted that when the onboard energy storage system 40 is charged by an external static DC or AC and the electric propulsion system 100 is earthed, it is enough that the electrically isolated coupling assembly 20 is configured to provide electrical isolation of at least the first and the second electrical machines 12, 14 relatively each other. However, in situations when the electric propulsion system 100 is not connected to earth, e.g. when the onboard energy storage system is charged by the external electric DC supply source, the first and second electrical machines 12, 14 should be electrical isolated relatively each other and also relatively the chassis, respectively. Thus, as described in relation to FIG. 5a, the electrically isolated coupling assembly is typically, although not strictly required, configured to provide individual electrical isolation of at least the first and the second electrical machines 12, 14 relative each other and relative the chassis 70. This may sometimes be denoted as the electrically isolated coupling assembly is configured to provide double electrical isolation.

Moreover, as illustrated in FIG. 5a, the outgoing shaft 15 and the outgoing shaft 17 of the first and second electric machines, respectively, are coupled to the propulsion shaft 16. The outgoing shaft 15 and the outgoing shaft 17 of the first and second electric machines, respectively, can also be coupled to the propulsion shaft 16 by the transmission. If the electric propulsion system 100 comprises the transmission, the first and the second electrical machines 12, 14 should be electrically isolated relatively each other, relatively the chassis 70 and relatively the transmission. It is to be noted that the features, functions and examples described in relation to FIG. 5a can be incorporated in the example embodiment described in relation to FIG. 2, or in any other of the example embodiments described in relation to FIGS. 3a-3b and 4.

Figure 5B:
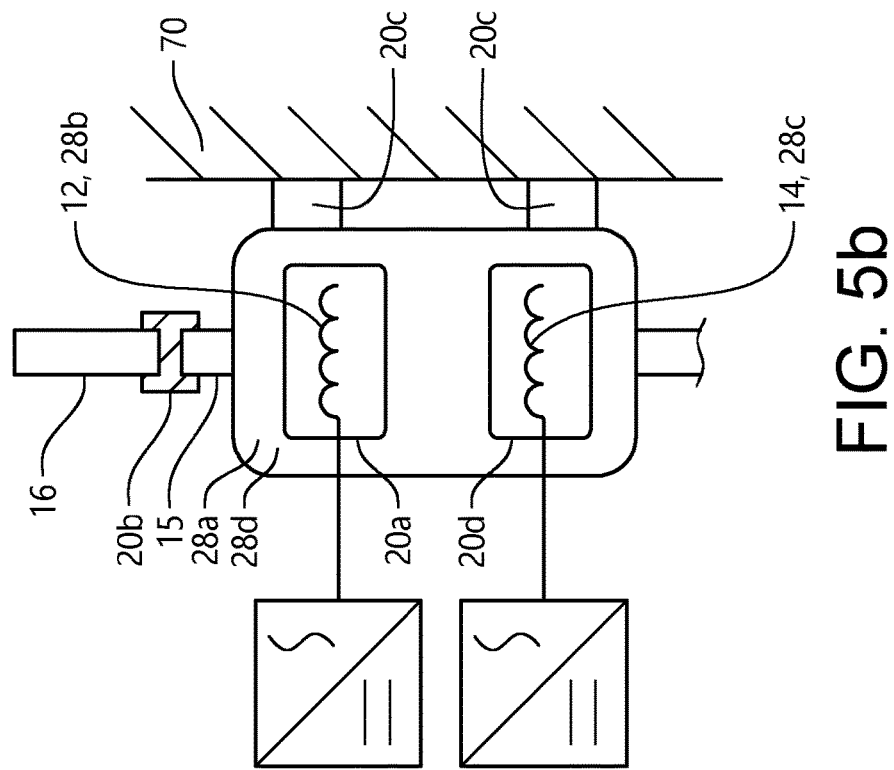
FIGS. 5a-5d schematically illustrate parts of example embodiments of an electrically isolated coupling assembly for an electric propulsion system according to the invention.
Figure 5A:
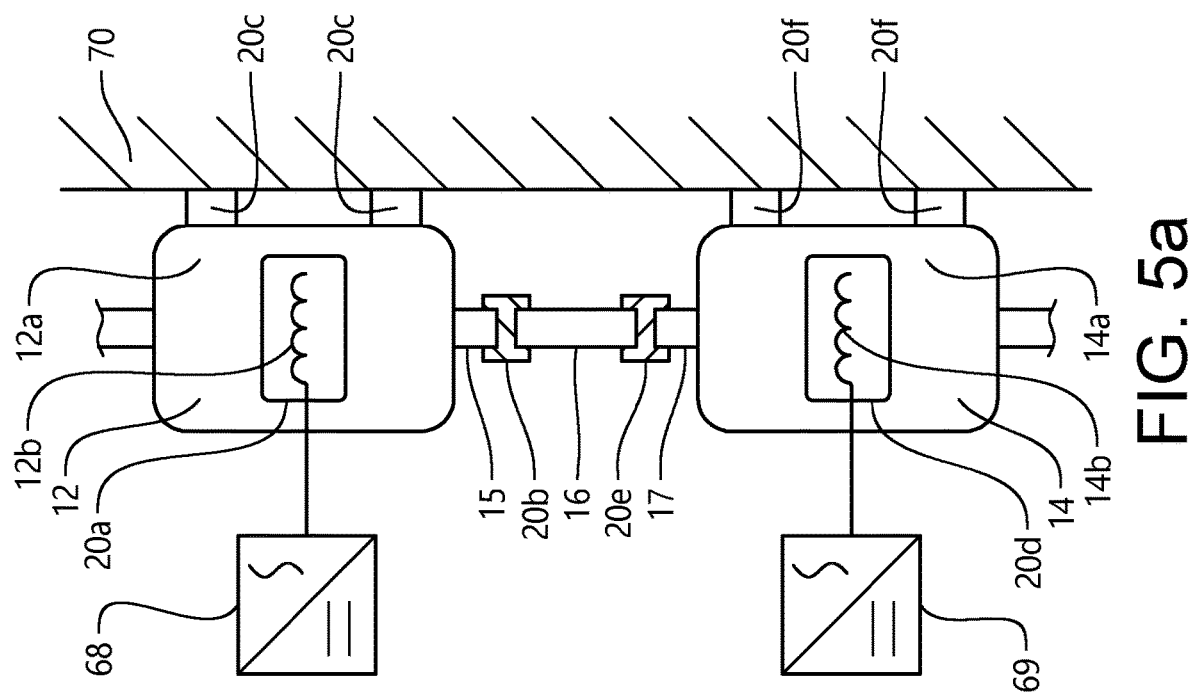
Figure 5D:
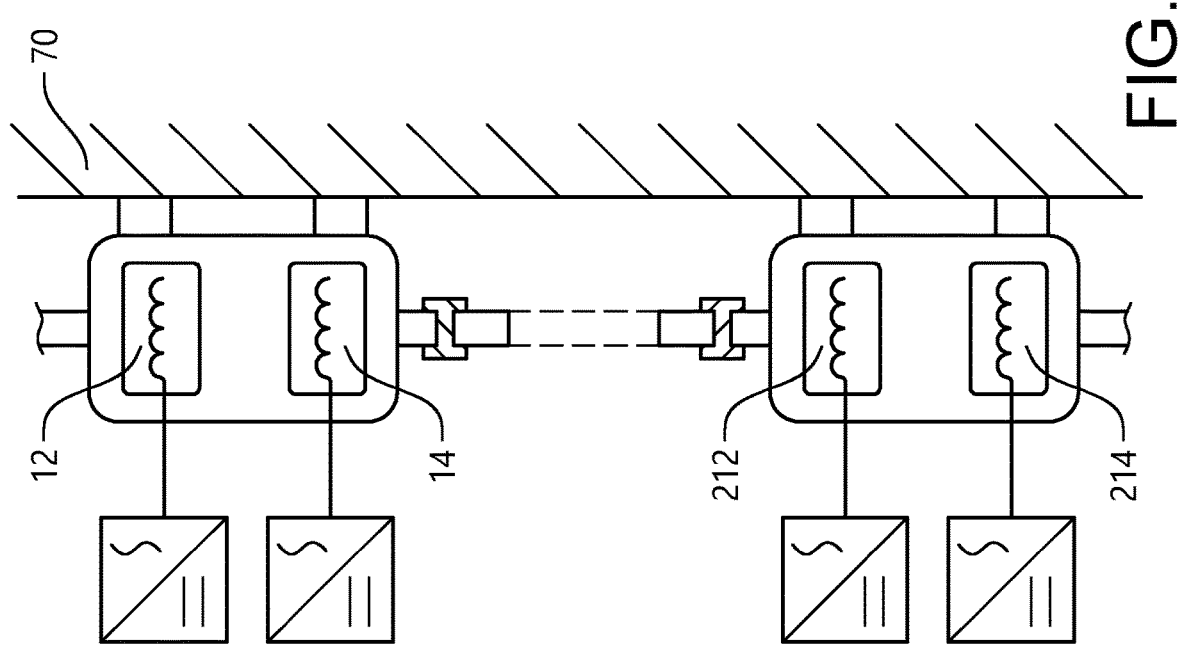
Figure 5C:
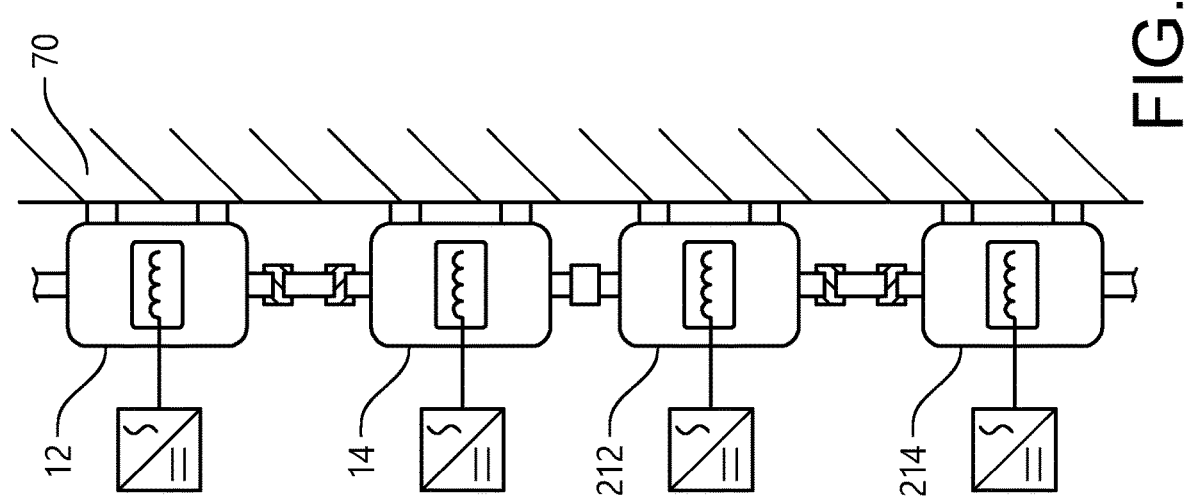

FIGS. 5b-5d schematically illustrate other example embodiments of other electrically isolated coupling assemblies for other examples of electric propulsion systems comprising a number of electrical machines. Unless explicitly mentioned below, the example embodiments of the electrically isolated coupling assemblies of the various electric propulsion systems in FIGS. 5b-5d can incorporate any one of the features, functions and examples described in relation to FIG. 5a. In FIG. 5b, the first electrical machine 12 and the second electrical machine 14 are embedded in a common housing 28a, the first electrical machine corresponds to a first set of multi-phase stator windings 28b and the second electrical machine corresponds to a second set of multi-phase stator windings 28c. The first and second set of multi-phase stator windings are electrically isolated from each other and arranged to rotate a common rotor 28d. Further the common housing, the common rotor and a magnetic core (not shown) are further electrical isolated from the chassis 70 similar to the configuration of the electrical isolation of the first electric machine described in relation to FIG. 5a. In FIG. 5c, the electric propulsion system comprises additional electrical machines. That is, the electric propulsion system 100 comprises four electrical machines 12, 14, 212, 214. Each one of the electrical machines essentially corresponds to the electrical machines described in relation to FIG. 5a, while the electrical machines in FIG. 5d are connected in parallel to each other, as is also illustrated in FIG. 5d. Also, each one of the electrical machines is connected to an individual bidirectional AC/DC converter, similar to the electrical machines in FIG. 2 and FIG. 5a, which are connected to e.g. the switch assembly 30 (as in FIG. 2) or directly to the onboard energy storage system (as in FIG. 3a). The corresponding outgoing shafts of the electric machines, respectively, are coupled to the propulsion shaft 16. FIG. 5d depicts another electric propulsion system 100 having further electrical machines connected in parallel, with their axles electrically isolated from each other. In this example embodiment, each one of the electrical machines essentially corresponds to the electrical machines described in relation to FIG. 5b, while the electrical machines in FIG. 5d are connected in parallel to each other, with all connecting axles electrically isolated from the other machines, as is also illustrated in FIG. 5d. Also, each one of the electrical machines in FIG. 5d is connected to an individual bidirectional AC/DC converter, similar to the electrical machines in FIG. 2 and FIG. 5b, which are further connected to e.g. the switch assembly 30 (as in FIG. 2) or directly to the onboard energy storage system (as in FIG. 3a).

Figure 3A:
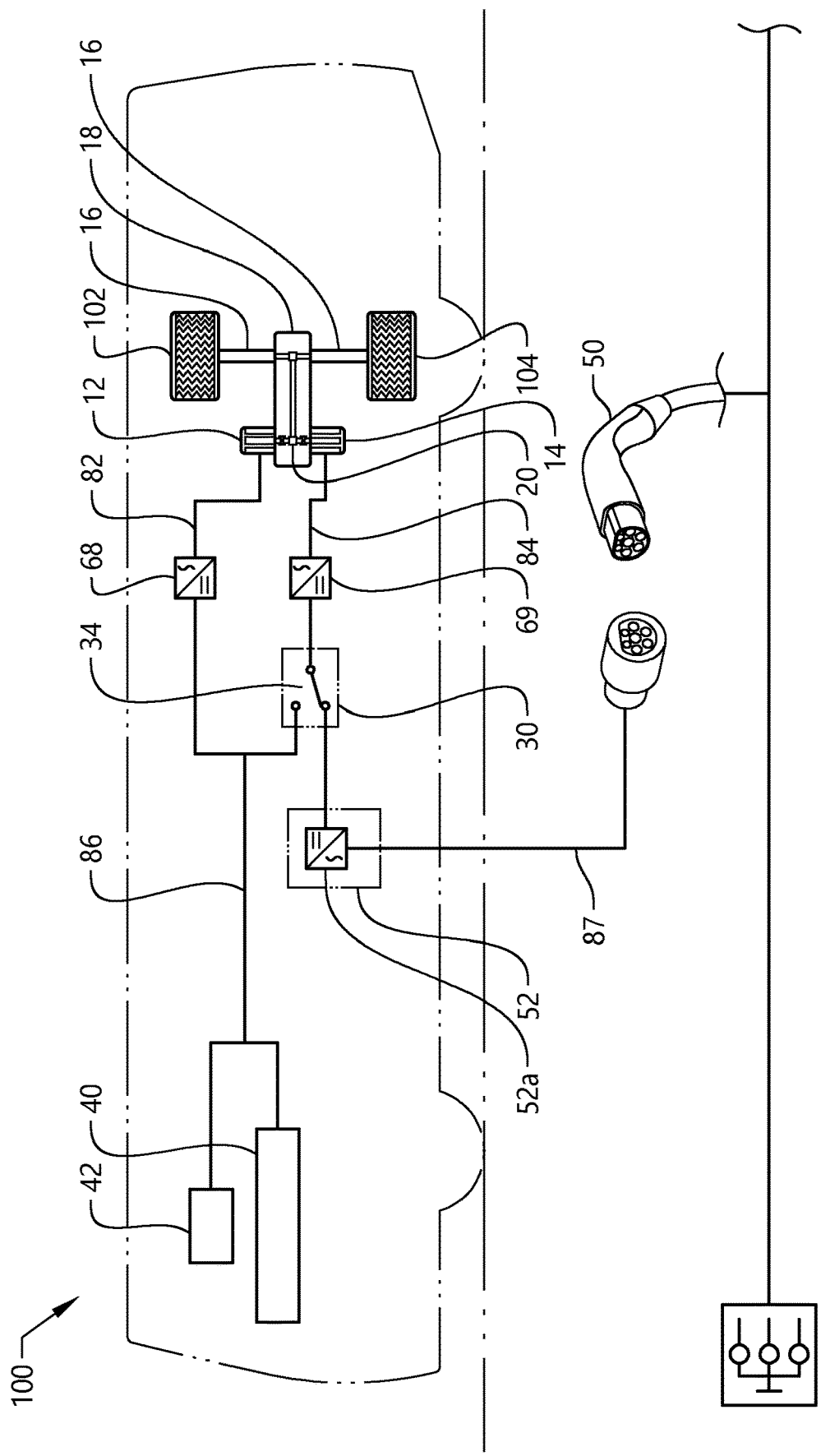
FIGS. 3a-3b schematically illustrate other example embodiments of parts of an electric propulsion system for a vehicle according to the invention.
Figure 3B:
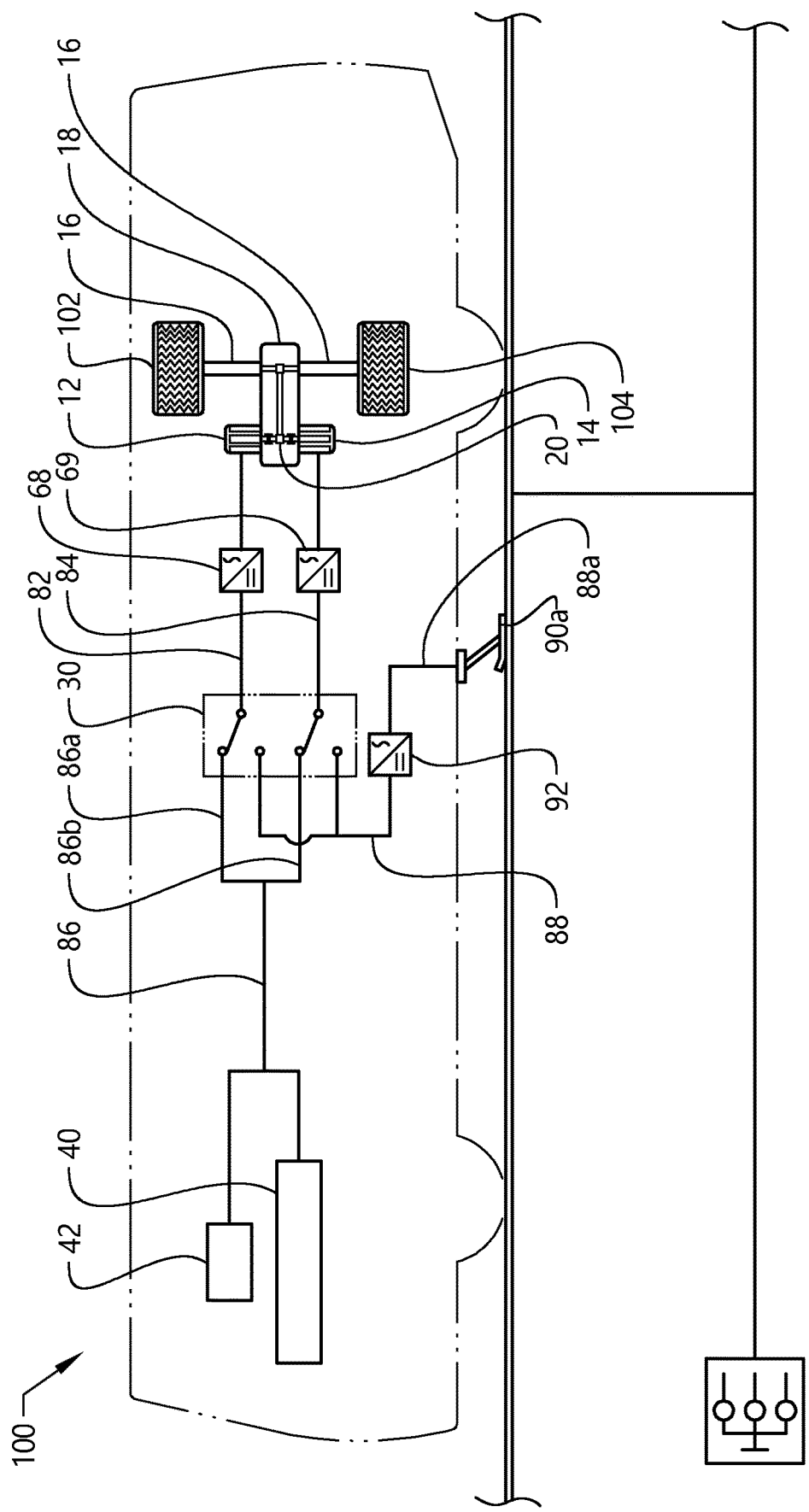
Figure 4:
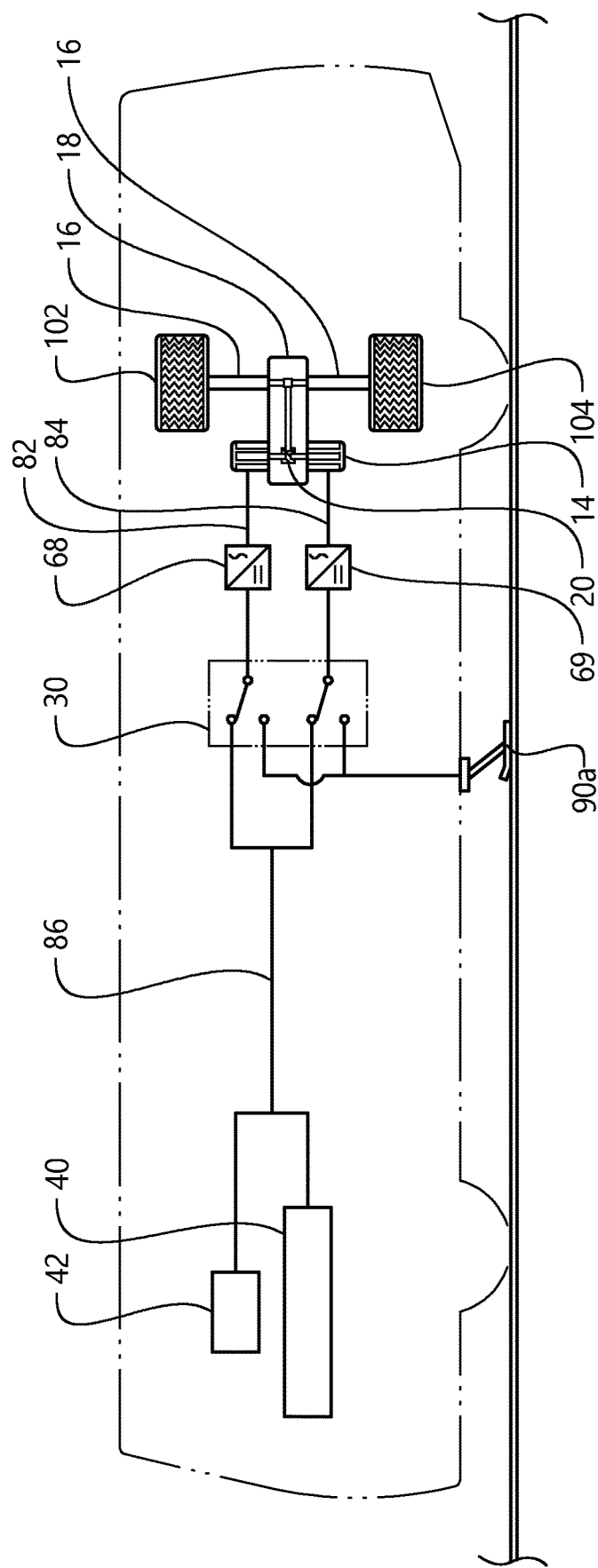
FIG. 4 schematically illustrates parts of an electric propulsion system for a vehicle according to yet another example embodiment of the invention.

It is to be noted that the features, functions and examples described in relation to any one of the FIGS. 5b-5d can be incorporated in the example embodiment described in relation to FIG. 2, or in any other of the example embodiments described in relation to FIGS. 3a-3b and 4.

Turning now again to FIG. 2 and the components of the electric propulsion system 100, the electric propulsion system 100 also comprises a switch assembly 30, a first bidirectional DC/AC converter 68 and a second bidirectional DC/AC converter 69. The first bidirectional DC/AC converter 68 is disposed in a first electrical connection 82. The first electrical connection 82 extends from the first electrical machine 12 to the switch assembly 30. In particular, the first bidirectional DC/AC converter 68 is disposed in the first electrical connection 82 and in-between the first electrical machine 12 and the switch assembly 30.

Analogously, the electric propulsion system 100 comprises the second bidirectional DC/AC converter 69 disposed in a second electrical connection 84. The second electrical connection 84 extends from the second electrical machine 14 to the switch assembly 30.

In particular, the second bidirectional DC/AC converter 69 is disposed in the second electrical connection 84 and in-between the second electrical machine 14 and the switch assembly 30.

As illustrated in FIG. 2, the switch assembly 30 is connected via the bidirectional DC/AC converters 68, 69 to the first and second electrical machines 12, 14, respectively, and further connected to the onboard energy storage system 40. In particular, the first electrical machine 12 is connected to the switch assembly 30 by the first electrical connection 82 and via the first bidirectional DC/AC converters 68. Analogously, the second electrical machine 14 is connected to the switch assembly 30 by the second electrical connection 84 and via the second bidirectional DC/AC converters 69. As mentioned herein, the electrical connections are adapted for transferring electrical power.

Moreover, the switch assembly 30 is connected via a common electrical connection 86 to the onboard energy storage system 40. In this example, the common electrical connection 86 comprises a first branch electrical connection 86a and a second branch electrical connection 86b. As illustrated in FIG. 2, the common electrical connection 86 is connected to a first terminal of the switch assembly and a second terminal of the switch assembly via the first branch electrical connection 86a and the second branch electrical connection 86b, respectively. The common electrical connection and the corresponding branches 86a, 86b, are adapted to transfer electrical power between the switch assembly 30 and the onboard energy storage system 40.

Accordingly, the switch assembly 30 is configured to individually connect each one of the first electrical machine 12 and the second electrical machine 14 to the onboard energy storage system 40. In particular, in the example as illustrated in FIG. 2, the switch assembly 30 is configured to individually connect each one of the first electrical machine 12 and the second electrical machine 14 to either the onboard energy storage system 40 or to any one of the externally supplied power sources 50, 90. In this example, the externally supplied power source 50 is an electric AC grid static supply source, while the externally supplied power source 90 is a conductive electric road system continuous AC or DC supply.

In other words, as illustrated in e.g. FIG. 2, the switch assembly 30 is configured to individually connect the first electrical machine 12 to either the onboard energy storage system 40 or any one of the number of externally supplied power sources 50, 90 and further configured to individually connect the second electrical machine 14 to either the onboard energy storage system 40 or any one of the number of externally supplied power sources 50, 90. Thus, the switch assembly 30 is configured to individually connect one of electrical machines, e.g. machine 12, to the onboard energy storage system via the switch assembly 30 and to individually connect the other one of the electrical machines, e.g. machine 14, to one of the electric AC grid static supply source 50 and the conductive electric road system continuous AC or DC supply 90 via the switch assembly 30. Also, the switch assembly is configured to individually connect one of electrical machines to the onboard energy storage system via the switch assembly and to individually connect the other one of the electrical machines to the onboard energy storage system via the switch assembly. Further, the switch assembly is configured to individually connect one of electrical machines to one of the electric AC grid static supply source 50 and the conductive electric road system continuous AC or DC supply 90 via the switch assembly and to individually connect the other one of the electrical machines to the one of the electric AC grid static supply source 50 and the conductive electric road system continuous AC or DC supply 90 via the switch assembly.

By this configuration of the switch assembly, the switch assembly 30 is configured to set the electric propulsion system in a number of operational modes. In this example embodiment, the operational modes include a traction operational mode and an electrical energy charging operational mode, sometimes simply denoted as the charging mode.

In other words, the switch assembly 30 is configured to control electrical power between at least one of the first and second electrical machines 12, 14, the onboard energy storage system 40 and at least one externally supplied power source. In particular, when the electric propulsion system is in a traction mode receiving power from the onboard energy storage system 40, the switch assembly 30 is configured to direct electrical power from the onboard energy storage system 40 to at least one of the first and second electrical machines 12, 14. It should be readily appreciated that the switch assembly 30 can likewise direct electrical power from the onboard energy storage system 40 to both the first and second electrical machines 12, 14. More specifically, when the electric propulsion system is powered by the onboard energy storage system 40, power is transferred from the onboard energy storage system 40 to the first and second electrical machines 12, 14 via the switch assembly 30.

In addition, when the electric propulsion system is in a traction mode receiving power from the externally supplied power source 90, i.e. connected to the externally supplied power source in the form of a conductive electric road system continuous DC or AC supply 90, the switch assembly 30 is configured to direct electrical power from the externally supplied power source to at least one of the first and second electrical machines 12, 14. More specifically, when the electric propulsion system is powered by the conductive electric road system continuous DC or AC supply 90, power is transferred from the conductive electric road system continuous DC or AC supply 90 to the first and second electrical machines 12, 14 via the switch assembly 30.

Moreover, when the electric propulsion system is set in the charging mode, the onboard energy storage system is charged by at least one externally supplied power source. It is also conceivable that the onboard energy storage system can be charged by one of the electric machines working as an electric generator. Thus, when the electric propulsion system is set in the charging mode, at least one of the electrical machines 12, 14 is set to function as an electric generator to convert mechanical power to electricity by generating electrical power. Accordingly, when the electric propulsion system 100 is in the charging mode, the switch assembly 40 is configured to direct supplied electrical power from at least one externally supplied power source via the first and second electrical machines 12, 14 to the onboard energy storage system 40. Typically, although not strictly required, when the electric propulsion system 100 is in the charging mode, the switch assembly 30 is configured to direct generated electrical power from at least one of the first and second electrical machines 12, 14 to the onboard energy storage system 40.

Further, in order to convert the AC supply from the electric AC grid static supply source 50 to DC, the electric propulsion system 100 typically comprises a third bidirectional AC/DC converter assembly 52. By way of example, the third bidirectional AC/DC converter assembly 52 comprises a bidirectional AC/DC converter 52a and a filter (although not shown). The third bidirectional AC/DC converter assembly 52 is arranged in a third electrical connection 87 extending between the switch assembly 30 and the electric AC grid static supply source 50. In this manner, the electric propulsion system 100 is capable of connecting to the externally supplied AC power source in the form of the electric AC grid static supply source 50. It is to be noted that the electrical bus is typically connected to the electric AC grid static supply source 50 when there is a need for charging the onboard energy storage system 40 in a stand-still position of the electrical bus 1. In other words, the electric propulsion system 100 comprises the third bidirectional AC/DC converter assembly 52 being disposed in the electrical connection 87, which extends between the switch assembly 30 and the electric power grid static AC supply interface 50a. The electric power grid static AC supply interface typically comprises a connector or the like for connecting the vehicle to the external power grid static AC supply 50. The connector is typically a standard charging connector, which is e.g. illustrated in FIG. 2.

Turning again to FIG. 2, the electric propulsion system 100 is also configured to connect to the conductive electric road system continuous AC supply 90. In this manner, the electrical bus can be powered from the conductive electric road system continuous AC supply 90 during operation (driving) of the electrical bus. That is, the electrical machines 12, 14 can be powered directly by the conductive electric road system continuous AC supply 90 during driving of the electrical bus. Also, if desired or required, the onboard energy storage system 40 can be charged by the conductive electric road system continuous AC supply 90 during operation (driving) of the electrical bus. By way of example, the electric propulsion system 100 is connected to the conductive electric road system continuous AC supply 90 via the switch assembly 30 and a separate electrical connection 88, as illustrated in FIG. 2. In particular, the electric propulsion system 100 is connected to the conductive electric road system continuous AC supply 90 by a fourth electrical connection 88 extending between the switch assembly 30 and the conductive electric-road system continuous AC supply interface 90a. Further, there is a fourth AC/DC converter assembly 92 disposed in the fourth electrical connection for converting AC supply from the electric road system continuous AC supply 90 to DC. Typically, the fourth AC/DC converter assembly 92 is similar to the third AC/DC converter assembly 52. Thus, by way of example, the fourth bidirectional AC/DC converter assembly 92 comprises a bidirectional AC/DC converter and a filter (although not shown). That is, the electric propulsion system 100 comprises the fourth AC/DC converter assembly 92 disposed in the electrical connection 88, which extends between the switch assembly 30 and the conductive electric-road system continuous AC supply interface 90a. By the fourth AC/DC converter, it becomes possible to convert AC supply to DC on board by means of the fourth AC/DC converter 92. Thereby, the electric propulsion system 100 is also configured to connect to another type of externally supplied AC power source during driving of the electrical bus.

Further, in this example embodiment, the electric propulsion system 100 is also configured to be powered from an electric road system supplying DC. Thus, by way of example, the electric propulsion system 100 also comprises a switch device 44 disposed in the electrical connection 88 extending between the switch assembly 30 and the conductive electric road system continuous supply interface 90a. The switch device 44 may also be denoted as the electric road system switch device 44. As illustrated in FIG. 2, the switch device 44 is connected to the conductive electric road system continuous supply 90 via the electrical connection 88, which is branched into a branch electrical connection 88a and another branch electrical connection 88b. Accordingly, the electric propulsion system 100 is configured to connect to a conductive electric road system continuous supply via the AC/DC converter assembly 92, if the electric road system is supplying AC power, or via the switch device 44 directly to the electric road system, if it is supplying DC power. In this type of configuration, it is to be noted that the electrical connection 88 is separated into the branch electrical connection 88a and the branch electrical connection 88b. Hence, as illustrated in FIG. 2, the switch device 44 is connected to the conductive electric road system continuous supply 90 via the AC/DC converter assembly 92 and the branch electrical connection 88a, if the electric road system is supplying AC power or directly to the electric road system via the branch electrical connection 88b, if electric road system is supplying DC power.

By way of example, the conductive electric-road system continuous AC or DC supply interface 90a is provided in the form of a movable arm (also known as a pick-up) attached to the bottom of a vehicle. Power is then transferred from two tracks of a rail in the road via the movable arm attached to the bottom of a vehicle. Thus, the vehicle here comprises the arm that contacts the rail for transmitting electrical power from the electric road to the electric propulsion system. The transfer of power between the electric road and the electric propulsion system is typically based on inductive technology.

To this end, the switch assembly 30 is configured to control electrical power between the first and second electrical machines 12, 14, the onboard energy storage system 40, the electric AC grid static supply source 50 and the conductive electric road system continuous supply 90. In particular, when the electric propulsion system 100 is in the traction mode, the switch assembly 30 is configured to direct electrical power from the onboard energy storage system 40 to the first and second electrical machines 12, 14 via the respective first and second electrical connections and the respective bidirectional DC/AC converters 68, 69.

Moreover, when the electric propulsion system 100 is in the traction mode and connected to the conductive electric road system continuous supply 90, the switch assembly 30 can be configured to direct electrical power from the conductive electric road system continuous supply 90 to the first and second electrical machines 12, 14. In this traction mode, electrical power is transferred from the conductive electric road system continuous supply 90 to the first and second electrical machines 12, 14 via the switch assembly 30.

In addition, when the electric propulsion system 100 is in the charging mode and connected to the electric AC grid static supply source 50, the switch assembly 30 is configured to direct electrical power from the electric AC grid static supply source 50 to the onboard energy storage system 40.

In this charging mode, electrical power is transferred from the electric AC grid static supply source 50 to the onboard energy storage system 40 via the switch assembly 30 and via the first and second electrical machines 12, 14.

Moreover, the electric propulsion system 100 can also be set in a combined traction and charging mode when connected to the conductive electric road system continuous supply 90, as the switch assembly 30 can be configured to direct electrical power from the conductive electric road system continuous supply 90 to one of the first and second electrical machines 12, and 14 whereas the other one of the electrical machines is used to guide power to the onboard energy storage system 40 via the switch assembly. In this combined traction and charging mode, electrical power is transferred from the conductive electric road system continuous supply 90 to both the ground engaging member and to the onboard energy storage system 40 via the switch assembly 30 and via the first and second electrical machines 12, 14 during driving of the vehicle 1. In other words, electric power is fed from the conductive electric road system continuous supply 90 to one of the electrical machines via the switch assembly 30 and at least a portion of the electric power is fed from the other one of the electrical machines to the onboard energy storage system 40 via the switch assembly 30.

In any one of the operational modes described above when the onboard energy storage system is being charged, one of the electric machines 12, 14 may work as an electric generator. Thus, each one of the electrical machines 12, 14 can be set to function as an electric generator to convert mechanical power to electricity by generating electrical power. Accordingly, the switch assembly 30 is configured to direct generated electrical power from at least one of the first and second electrical machines 12, 14 to the onboard energy storage system 40.

Figure 6B:
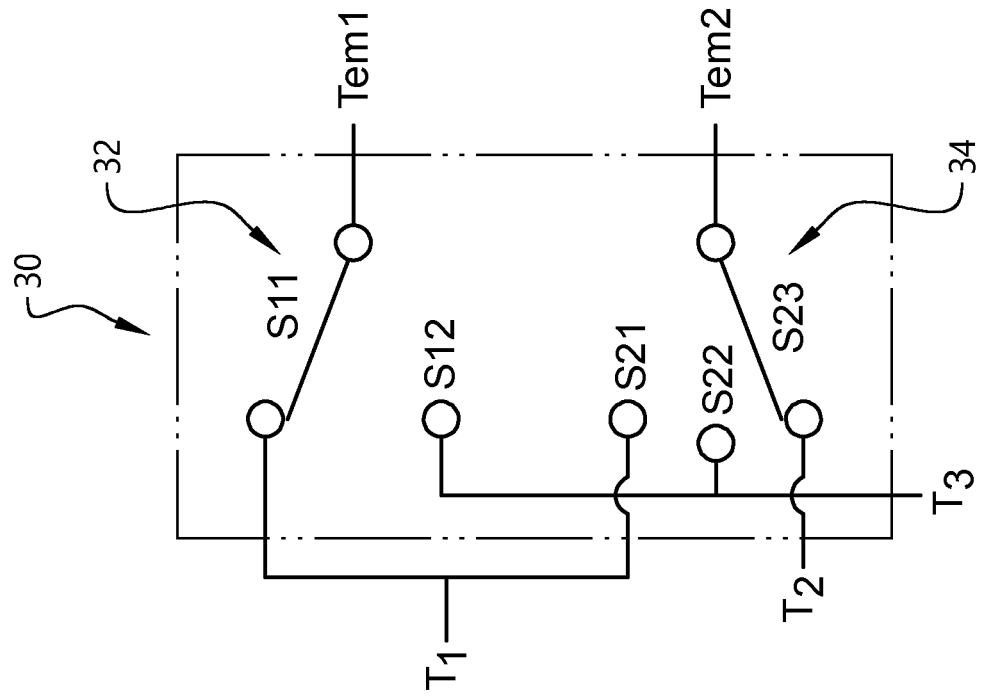
FIGS. 6a-6c schematically illustrate parts of example embodiments of a switch assembly for an electric propulsion system according the invention.

Turning now again to the switch assembly 30, as illustrated in e.g. FIG. 2, the configuration of the switch assembly can be provided by one or a number of switch devices. By way of example, the switch assembly 30 comprises a number of switch devices including a first switch device 32 for the first electrical machine 12 and a second switch device 34 for the second electrical machine 14. Each one of the first and second switch devices 32, 34 has a terminal coupled to a corresponding electrical machine, a terminal coupled to the onboard energy storage system 40 and a terminal coupled to one of the number of externally supplied power sources. In FIG. 6b, there is depicted additional details of one example embodiment of a switch assembly 30 for the electric propulsion system according to the example embodiment described in relation to e.g. FIG. 2, which is also possible to implement in the other example embodiments described in relation to FIGS. 3a-3b and FIG. 4 unless stated otherwise. The switch assembly 30 having the first switch device 32 for the first electrical machine 12 and the second switch device 34 for the second electrical machine 14 will now be described in conjunction with FIG. 2 and FIG. 6b. The first switch device 32 has a terminal Tem1 for connection with the first electrical machine 12, a terminal S11 for connection with the onboard energy storage system 40 (T1 in FIG. 6b) and a terminal S12 for connection with the conductive electric road system continuous supply 90 (T3 in FIG. 6b). Thus, the first switch device 32 is configured to control the connection between the first electrical machine 12 and the onboard energy storage system 40 and the connection between the conductive electric road system continuous supply 90 and the first electrical machine 12. That is, the first switch device 32 is configured to switch between a state when electrical power can be transferred between first electrical machine 12 and the onboard energy storage system 40, i.e. between Tem1 and T1, and a state when electrical power can be transferred between the conductive electric road system continuous supply 90 and the first electrical machine 12, i.e. between T3 and Tem1.

Analogously, the second switch device 34 has a terminal Tem2 for connection with the second electrical machine 14, a terminal S21 for connection with the onboard energy storage system 40 (T1 in FIG. 6b), a terminal S22 for connection with the conductive electric road system continuous supply 90 (T3 in FIG. 6b) and a terminal S23 for connection with the electric AC grid static supply source 50 (T2 in FIG. 6b). Thus, the second switch device 34 is configured to control the connection between the second electrical machine 14 and the onboard energy storage system 40, the connection between the conductive electric road system continuous supply 90 and the second electrical machine 14 and the connection between the electric AC grid static supply source 50 and the second electrical machine 14. That is, the second switch device 34 is configured to switch between a state when electrical power can be transferred between the second electrical machine 14 and the onboard energy storage system 40, i.e. between Tem2 and T1, a state when electrical power can be transferred between the conductive electric road system continuous supply 90 and the second electrical machine 14, i.e. between T3 and Tem2, and a state when electrical power can be transferred between the electric AC grid static supply source 50 and the second electrical machine 14, i.e. between T2 and Tem2. In this manner, the switch assembly 30 is configured to switch between the corresponding traction mode and charging mode, as mentioned above, by controlling the first switch device 32 and the second switch device 34. Typically, switch device is controlled by the control unit, as mentioned above. Accordingly, the electric propulsion system typically comprises the control unit (not shown) configured to control the switch assembly 30 between a number of operational modes comprising the traction mode and the charging mode, as described above.

Figure 6A:
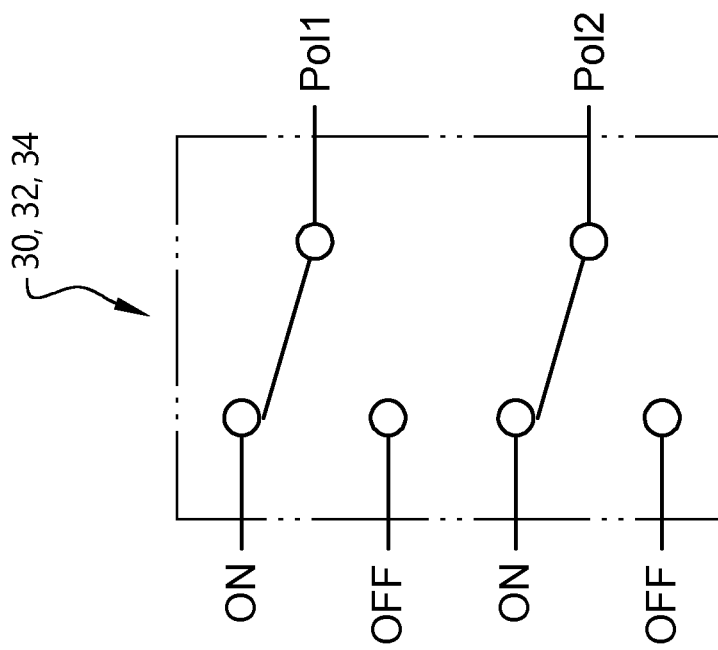
Figure 6C:
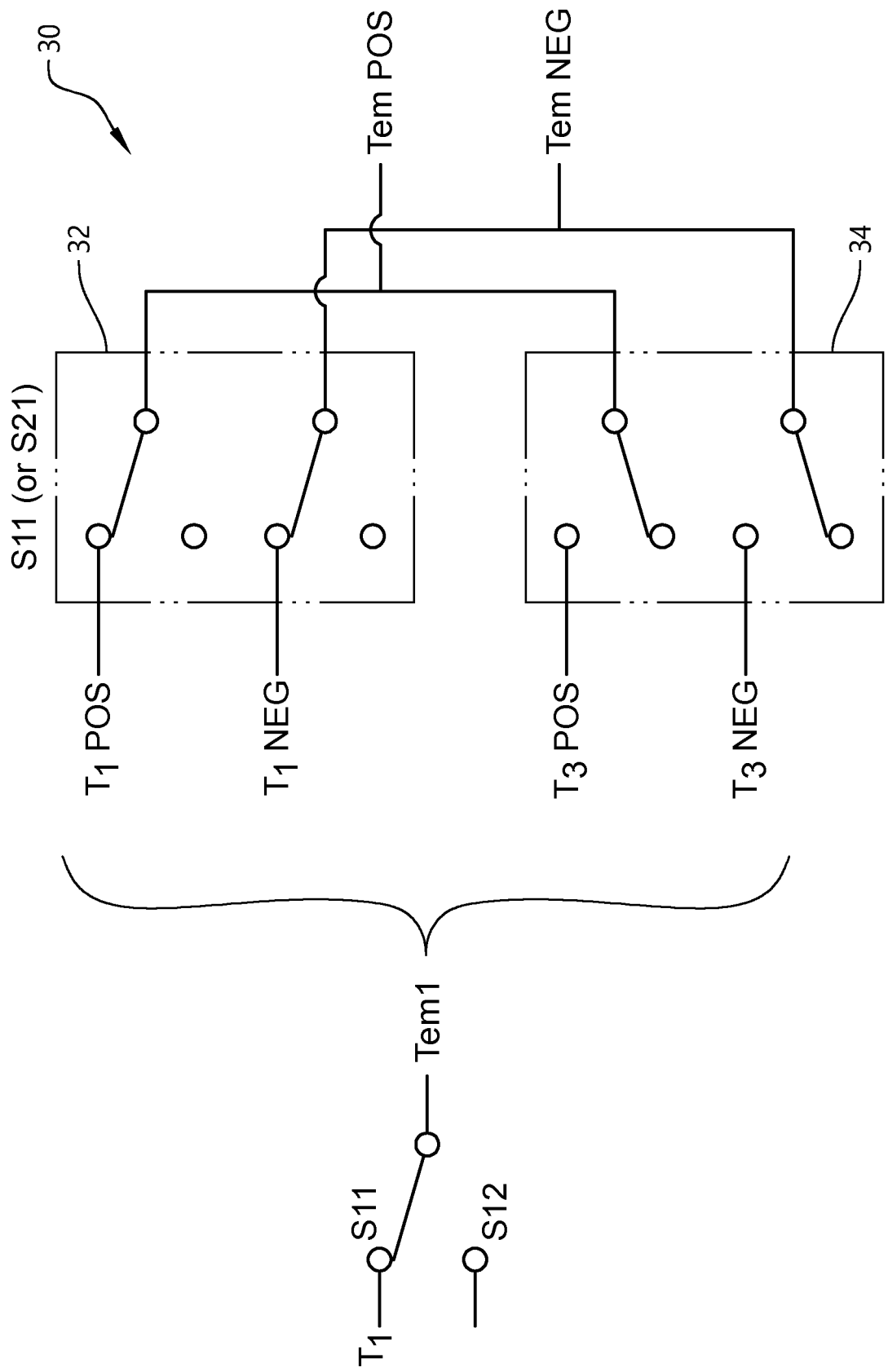

It should also be noted that each one of the switch devices 32, 34, which are denoted S11/S12, S21/S22/S23 in e.g. FIG. 6b, each represents a two-pole switch switching both the negative and positive pole of the corresponding electric connection. However, the switch devices 32 and 34 can be provided in several different manners, e.g. by one double pole on-off switch or two single pole on-off switches. In FIG. 6a, there is depicted one example of a double pole on-off switch, and FIG. 6c depicts one example of two double pole on-off switches used to implement the switching between S11 and S12. It should be noted that the OFF-position of the two double pole switches are used to provide an intermediate state when the first or second electric machines 12, 14 are temporarily disconnected from any one of the possible energy storage system or off-board electric power sources. These types of switch devices are commonly known in the art, and thus not further described herein.

Accordingly, by using a switch assembly as described above in relation to FIG. 2 and e.g. FIG. 6b, each one of the first and second electrical machines 12, 14 are separately connected to the switch assembly 30 via the first and second bidirectional DC/AC converters 68, 69, respectively. In particular, the first electrical machine 12 is separately connected to the switch assembly by the first electrical connection 82 and the second electrical machine 14 is separately connected to the switch assembly 30 by the second electrical connection 84. As mentioned above, the first bidirectional DC/AC converter 68 is disposed in the first electrical connection, and in-between the first electrical machine and the switch assembly, while the second bidirectional DC/AC converter 69 is disposed in the second electrical connection, and in-between the second electrical machine and the switch assembly. By this configuration, the switch assembly 30 is arranged to individually connect each one of the first electrical machine 12 and the second electrical machine 14 to the onboard energy storage system 40 and the externally supplied power sources 50, 90.

Turning now again to the various externally supplied power sources, the description above in relation to FIG. 2 mainly refers to the conductive electric road DC power supply, the conductive electric road AC power supply, the electric AC grid static supply. However, it is also conceivable that the electric propulsion system 100 can be configured to supply the electric AC grid static source with electrical power. Thus, the electric propulsion system 100 can also be set in an electric AC grid static supplying mode. In this mode, the electric propulsion system 100 can supply the electric AC grid static source with electrical power when the vehicle is connected to the source, which typically refers to a state when the vehicle is in the stand-still state. Accordingly, the operational modes include any one of the conductive electric road DC power supply mode, the conductive electric road AC power supply mode, the electric AC grid static charging mode and the electric AC grid static supplying mode. The operational modes also include a combined traction and charging mode where electric power is fed from the external supplied power source 90 to at least one of the electrical machines 12, 14 and at least a portion of the electric power is fed from the at least one of the electrical machines 12, 14 to the onboard energy storage system 40.

In FIG. 3a, there is depicted another example embodiment of parts of an electric propulsion system 100. The electric propulsion system 100 is similar to the electric propulsion system described in relation to FIGS. 1, 2 and can incorporate any one of the features, functions and examples in relation to FIGS. 1, 2, 5a-5d and 6a-6c, unless otherwise stated and unless there is no contradiction between the configurations of the systems. As illustrated in FIG. 3a, the electric propulsion system 100 comprises the onboard energy storage system 40, the first and second electrical machines 12, 14, the first and second bidirectional DC/AC converters 68, 69 and the switch assembly 30.

However, in this example embodiment, only the second electrical machine 14 is connected to the switch assembly 30 via the second bidirectional DC/AC converter 69, while the first electrical machine 12 is connected directly to the onboard energy storage system 40. This type of electric propulsion system provides a relatively simple and inexpensive configuration when implemented in the vehicle.

Accordingly, the second bidirectional DC/AC converter 69 is disposed in the second electrical connection 84, and in-between the second electrical machine 14 and the switch assembly 30. Further, the first bidirectional DC/AC converter 68 is disposed in the first electrical connection 82, and in-between the first electrical machine 12 and onboard energy storage system 40. Typically, although not strictly required the first electrical connection is connected to the onboard energy storage system 40 via the common electrical connection 86. The switch assembly 40 is also connected to the onboard energy storage system via the common electrical connection 86. At least for the reasons above, the switch assembly 30 in this example can be provided in the form of a single switch device, as described by FIG. 6c. For instance, it is sufficient that the switch assembly 30 only comprises the features and functions of the switch device 34, as mentioned in relation to FIG. 2 and FIGS. 6a-6c. Moreover, as the electric propulsion system in FIG. 3a is only configured to connect to one of the external power supply sources, i.e. the electric AC grid static supply source 50, it is sufficient that the switch assembly 30 is configured to the electric propulsion system in the traction mode and in the charging mode corresponding to the electric AC grid static charging mode. The relevant traction modes and charging modes are e.g. described above in relation to FIG. 2. It should also be readily appreciated that the electric propulsion system described in relation to FIG. 3a typically comprises the features of the third bidirectional AC/DC converter assembly 52.

As mentioned above, the third bidirectional AC/DC converter assembly 52 comprises the bidirectional AC/DC converter 52a and a filter (although not shown). The third bidirectional AC/DC converter assembly 52 is arranged in the third electrical connection 87 extending between the switch assembly 30 and the electric AC grid static supply interface 50a.

In FIG. 3b, there is depicted another example embodiment of parts of an electric propulsion system 100. The electric propulsion system 100 is similar to the electric propulsion system described in relation to FIGS. 1, 2 and can incorporate any one of the features, functions and examples in relation to FIGS. 1, 2, 5a-5d and 6a-6c, unless otherwise stated and unless there is no contradiction between the configurations of the systems. As illustrated in FIG. 3b, the electric propulsion system 100 comprises the onboard energy storage system 40, the first and second electrical machines 12, 14, the first and second bidirectional DC/AC converters 68, 69 and the switch assembly 30. However, in this example embodiment, the electric propulsion system is only configured to connect to one of the external power supply sources, i.e. the conductive electric road system continuous AC supply 90. In this manner, the electrical bus can be powered from the conductive electric road system continuous AC supply 90 during operation (driving) of the electrical bus. That is, the electrical machines 12, 14 can be powered directly by the conductive electric road system continuous AC supply 90 during driving of the electrical bus. Also, if desired or required, the onboard energy storage system 40 can be charged by the conductive electric road system continuous AC supply 90 during operation (driving at any speed including stand still) of the electrical bus. The electric propulsion system 100 is connected to the conductive electric road system continuous AC supply 90 via the switch assembly 30 and via the fourth electrical connection 88, 88a extending between the switch assembly 30 and the conductive electric-road system continuous AC supply interface 90a. Similar to the system in FIG. 2, the system in FIG. 3b comprises the fourth AC/DC converter assembly 92 disposed in the fourth electrical connection 88 for converting AC supply from the electric road system continuous AC supply 90 to DC. As mentioned above with respect to FIG. 2, the fourth bidirectional AC/DC converter assembly 92 typically comprises a bidirectional AC/DC converter and a filter (although not shown). By arranging the fourth AC/DC converter between the switch assembly 30 and the continuous AC supply 80, it becomes possible to convert AC supply to DC on board by means of the fourth AC/DC converter 92.

In FIG. 4, there is depicted another example embodiment of parts of an electric propulsion system 100. The electric propulsion system 100 is similar to the electric propulsion system described in relation to FIGS. 1, 2 and can incorporate any one of the features, functions and examples in relation to FIGS. 1, 2, 5a-5d and 6a-6c, unless otherwise stated and unless there is no contradiction between the configurations of the systems. As illustrated in FIG. 4, the electric propulsion system 100 comprises the onboard energy storage system 40, the first and second electrical machines 12, 14, the first and second bidirectional DC/AC converters 68, 69 and the switch assembly 30. In this example embodiment, the electric propulsion system is configured to connect an external power supply source in the form of the conductive electric road system continuous DC supply 90. In this manner, the electrical bus can be powered directly from the conductive electric road system continuous DC supply 90 during operation (driving) of the electrical bus, and also powered without using a bidirectional AC/DC converter assembly in the electrical connection between the switch assembly 30 and the external power supply source. Accordingly, this configuration of the electric propulsion system 100 provides for receiving electrical power from the conductive electric road system continuous DC supply 90 during operation (driving) of the vehicle in a similar manner as mentioned with respect to the system in FIG. 2.

The electric propulsion systems described in relation to the FIGS. 2, 3a-3b and 4 are typically controlled by the control unit during operation of the electric propulsion system.

Thus, although not shown, the vehicle or the system generally includes the control unit, which is configured to control the operations of the electric propulsion system and to set the electric propulsion system including the switch assembly and the electrical machines in the various operational modes, as described above in relation to the Figures. Software implementations could be accomplished with standard programming techniques with rule based logic and other logic to accomplish the various connection steps, processing steps, comparison steps and decision steps.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electrical vehicle.

The invention claimed is:

1. An electric propulsion system for a vehicle, said system comprising a first electrical machine and a second electrical machine for providing propulsion to said vehicle, wherein each one of the first and second electrical machines are embedded in separate first and second housings, respectively, and each one of the first and second electrical machines comprises a separate rotor and a separate set of multi-phase stator windings, and wherein said system further comprises:

an electrically isolated coupling assembly configured to provide electrical isolation between said first and second electrical machines, and further configured to provide individual electrical isolation of at least the first and the second electrical machines relatively each other and relatively a chassis of the vehicle, and wherein power is transferable from one of the electrical machines to the other one of the electrical machines by means of the electrically isolated coupling assembly;

a first bidirectional DC/AC converter disposed in a first electrical connection extending from the first electrical machine;

a second bidirectional DC/AC converter disposed in a second electrical connection extending from the second electrical machine;

a switch assembly connected via at least one of the bidirectional DC/AC converters to at least one of the first and second electrical machines and further connected to an onboard energy storage system; and wherein said switch assembly is configured to connect at least one of the first electrical machine and the second electrical machine to either the onboard energy storage system or to an externally supplied power source, thereby said switch assembly being configured to set the electric propulsion system in a number of operational modes.

2. System according to claim 1, wherein said switch assembly is connected to each one of the first and second electrical machines via the first and second bidirectional DC/AC converters, respectively.

3. System according to claim 2, wherein said first electrical machine is separately connected to said switch assembly by the first electrical connection and said second electrical machine is separately connected to the switch assembly by the second electrical connection, wherein the first bidirectional DC/AC converter is disposed in said first electrical connection, and in-between the first electrical machine and the switch assembly, while the second bidirectional DC/AC converter is disposed in said second electrical connection, and in-between the second electrical machine and the switch assembly;

said switch assembly further being configured to individually connect each one of the first electrical machine and the second electrical machine to either the onboard energy storage system or to the externally supplied power source.

4. System according to claim 3, wherein the electric propulsion system is configured to transfer power between the first electrical machine and the onboard energy storage system via the switch assembly, transfer power between the second electrical machine and the onboard energy storage system via the switch assembly, and, when said electrical propulsion system is connected to the externally supplied power source, to transfer power between the externally supplied power source and any one of the first and second electrical machines via the switch assembly.

5. System according to claim 1, wherein the operational modes include at least a traction mode and an electrical charging mode.

6. System according to claim 1, wherein the operational modes include a combined traction and charging mode where power is transferred from the externally supplied power source to at least one of the electrical machines via the switch assembly and at least a portion of the power is transferred from the at least one of the electrical machines to the onboard energy storage system.

7. System according to claim 1, wherein said operational modes include any one of a conductive electric road DC power supply mode, a conductive electric road AC power supply mode, an electric AC grid static charging mode and an electric AC grid static supplying mode.

8. System according to claim 1, wherein the switch assembly comprises a number of switch devices including at least a first switch device for said first electrical machine and a second switch device for said second electrical machine, each one of the first and second switch devices having a terminal coupled to a corresponding electrical machine, a terminal coupled to the onboard energy storage system and a terminal coupled to the externally supplied power source.

9. System according to claim 8, wherein any one of the switch devices of the number of switch devices comprises either one double pole on-off switch or two single pole on-off switches.

10. System according to claim 1, wherein the switch assembly is configured to individually connect each one of the first electrical machine and the second electrical machine to either the onboard energy storage system or to any one of a number of externally supplied power sources.

11. System according to claim 1, further comprising a third bidirectional AC/DC converter assembly disposed in an electrical connection extending between the switch assembly and an electric power grid static AC supply interface, thereby enabling said system to connect to an externally supplied AC power source.

12. System according to claim 1, wherein the system comprises a fourth AC/DC converter assembly disposed in an electrical connection extending between the switch assembly and a conductive electric-road system continuous AC supply interface, thereby enabling said system to connect to an externally supplied AC power source.

13. System according to claim 12, wherein the system further comprises a switch device disposed in the electrical connection extending between the switch device and the conductive electric road system continuous supply interface.

14. System according to claim 1, wherein the electrical machine is any one of a permanent magnet synchronous machine, a brushless DC machine, an asynchronous machine, an electrically magnetized synchronous machine, a synchronous reluctance machine or a switched reluctance machine.

15. System according to claim 1, further comprising a control unit configured to control the switch assembly to set the electric propulsion system in the number of operational modes.

16. A vehicle, such as a fully or hybrid electrical vehicle, comprising a chassis and an electric propulsion system according to claim 1.

17. A method for controlling an electric propulsion system according to claim 1, controlling the switch assembly, by means of a control unit, to set the electric propulsion system in any one of the number of operational modes.

* * * * *